United States Patent
Tsuchida

[19]

[11] Patent Number: 6,052,786
[45] Date of Patent: Apr. 18, 2000

[54] SECRECY COMMUNICATION SYSTEM

[75] Inventor: Shinichi Tsuchida, Kanagawa, Japan

[73] Assignee: Fujitsu Limited, Kanagawa, Japan

[21] Appl. No.: 09/001,227

[22] Filed: Dec. 30, 1997

[30] Foreign Application Priority Data

Jul. 22, 1997 [JP] Japan .................................. 9-195517

[51] Int. Cl.[7] .................................................. H04N 1/413
[52] U.S. Cl. ......................... 713/201; 713/201; 713/160; 380/37
[58] Field of Search ............................. 380/37; 713/160, 713/200, 201

[56] References Cited

FOREIGN PATENT DOCUMENTS 60-260254  12/1985  Japan .
61-81043   4/1986   Japan .

OTHER PUBLICATIONS

Schneier, "Applied Cryptography", pp. 2, 419, 1995.

Primary Examiner—Thomas R. Peeso
Attorney, Agent, or Firm—Helfgott & Karas, P.C.

[57] ABSTRACT

An encryption unit uses part of a pseudo random number generated by a random number generator to encrypt data to be transferred which are stored in the payload of a cell. A counter information assigning section inserts counter information indicating the order in which the cell was sent into that payload. A random number generator on a receiving side generates the same pseudo random number as the random number generator on a sending side. A counter information analysis section identifies the position of the part of the pseudo random number to be used in the encryption unit based on the counter information extracted from the received cell, and has the random number generator on the receiving side output that part of the pseudo random number. The encrypted transferred data are extracted from the received cell, and these transferred data are decrypted using the part of the pseudo random number output from the random number generator on the receiving side.

12 Claims, 20 Drawing Sheets

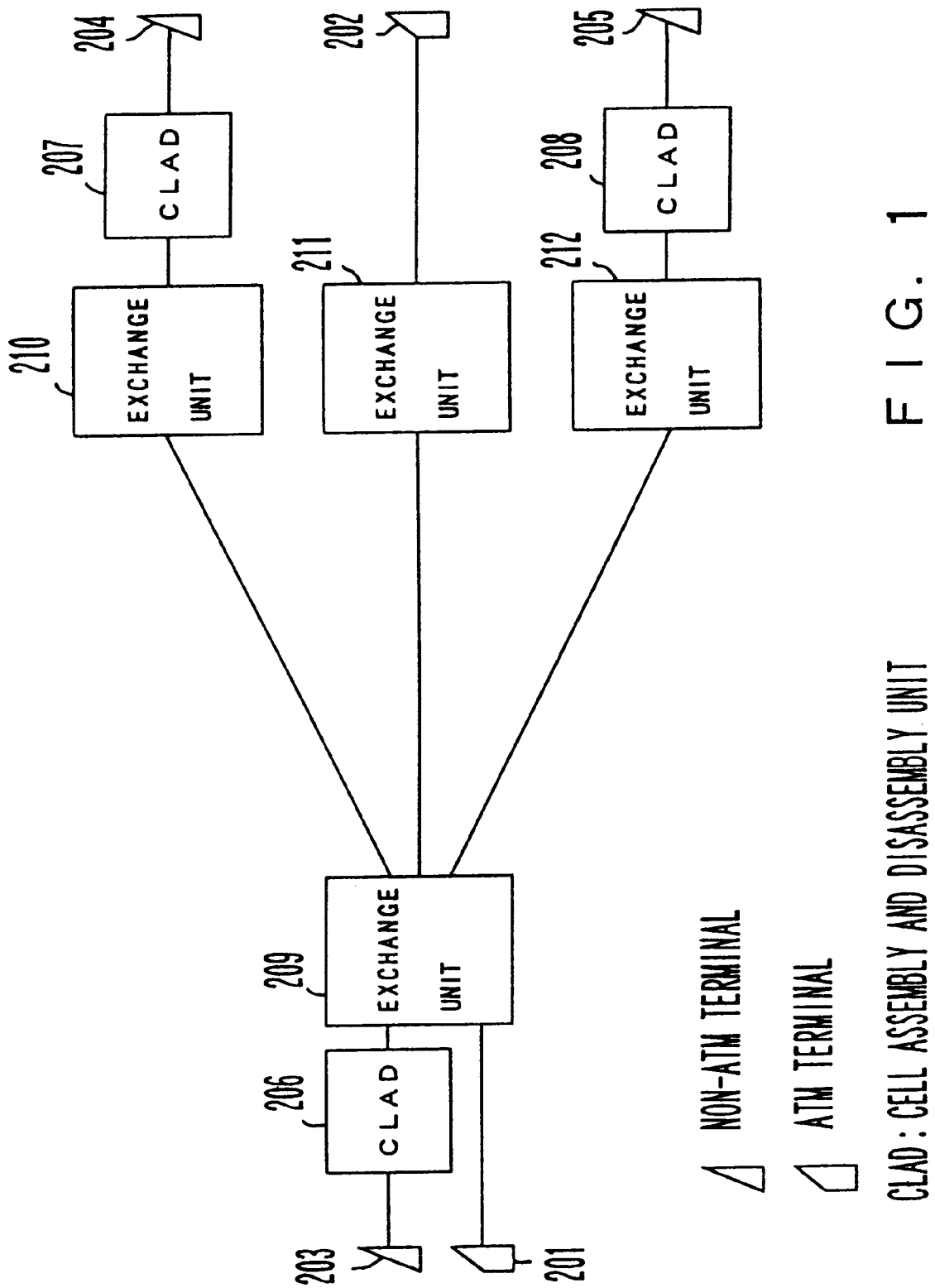
F I G. 1

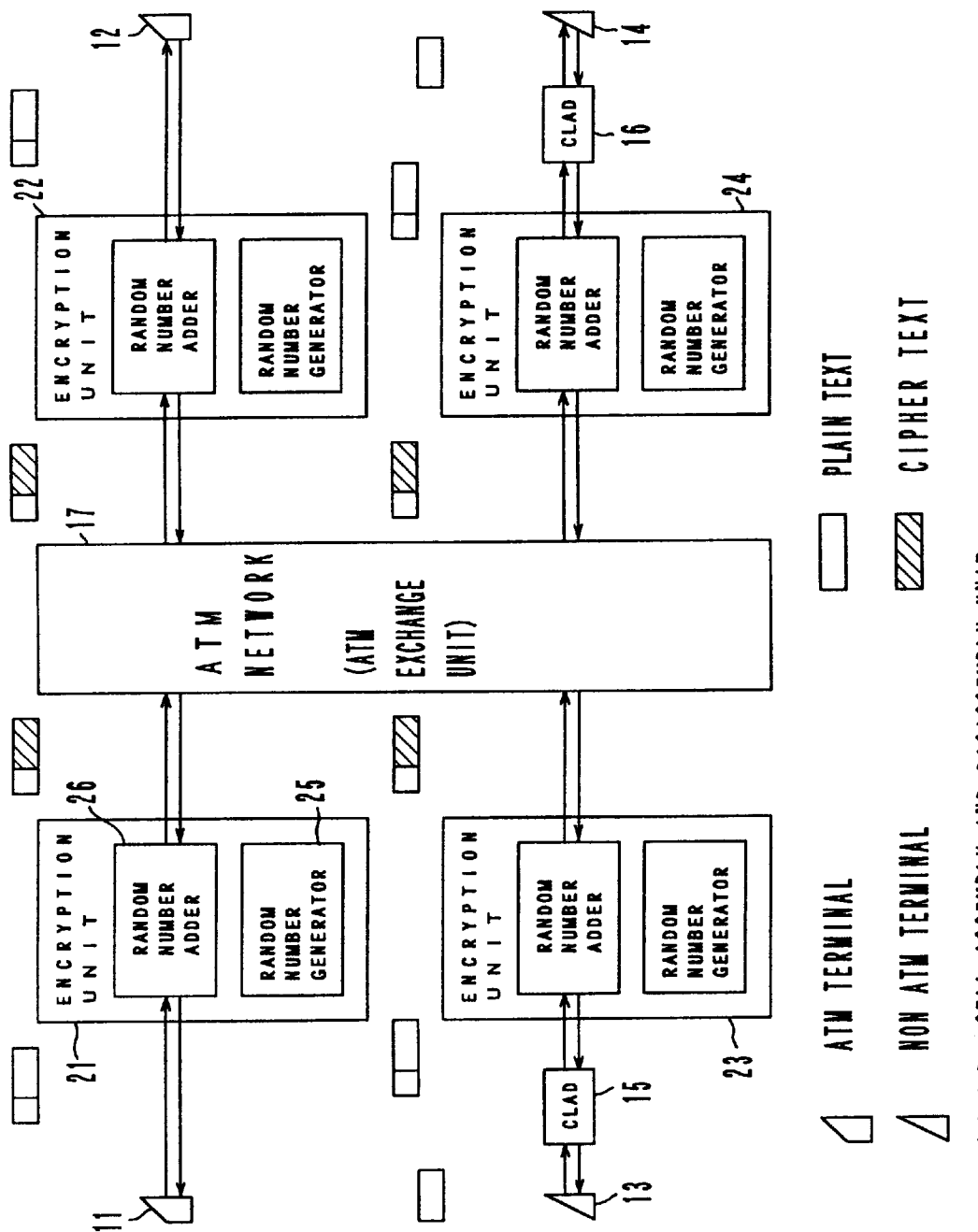

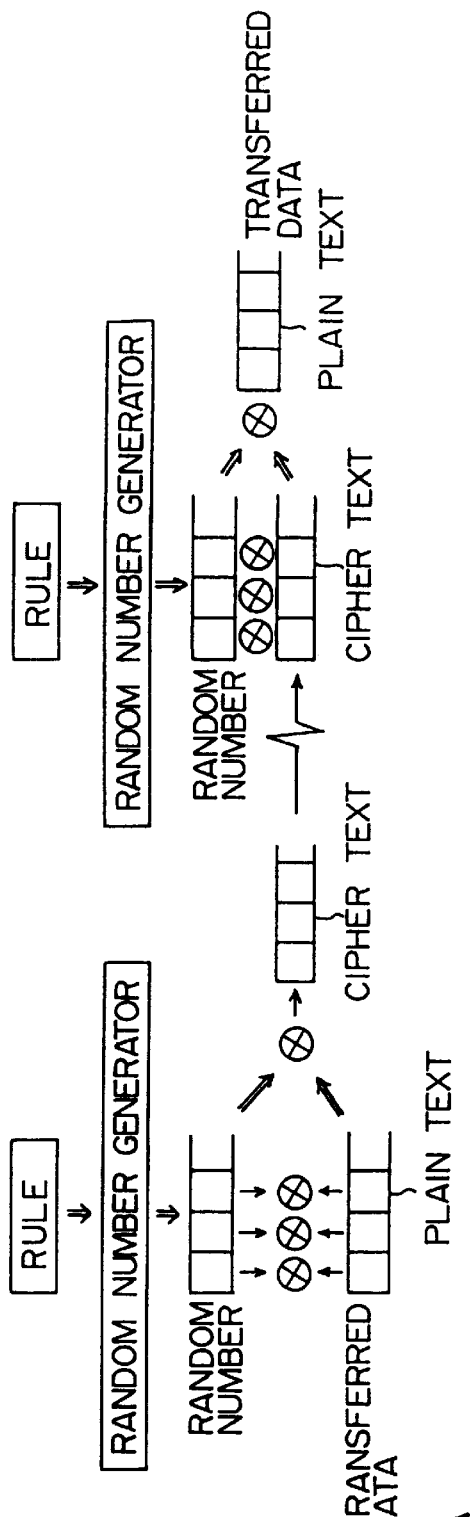
F I G. 5A
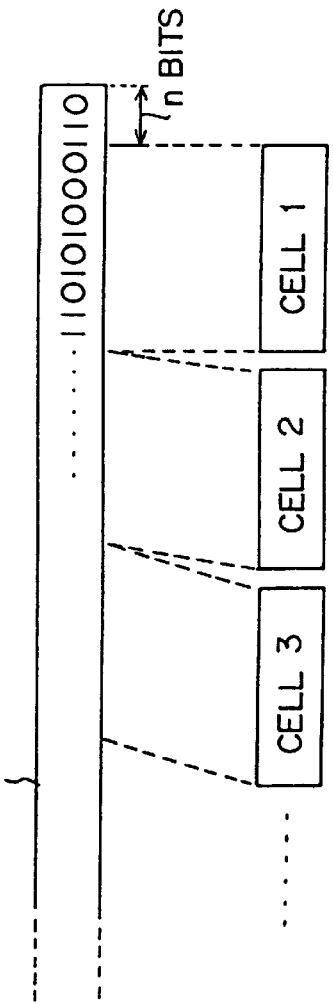
F I G. 5B

GFC : generic flow control
VPI : virtual path identitiers
VCI : virtual channel identitiers
PT : payload type
CLP : Cell Loss Priority
HEC : header error control

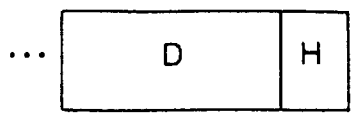
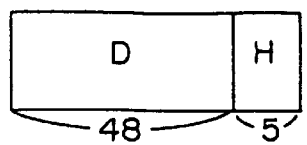
FIG. 10A
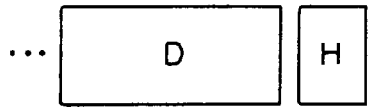
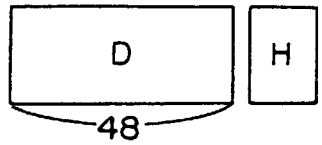
FIG. 10B
D: DATA TRANSFERRED BETWEEN TERMINALS
H: HEADER
C: COUNTER INFORMATION
▨ : CIPHER TEXT
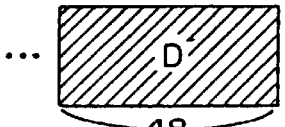
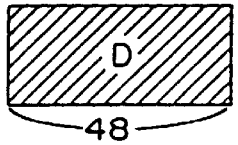
FIG. 10C
FIG. 10D
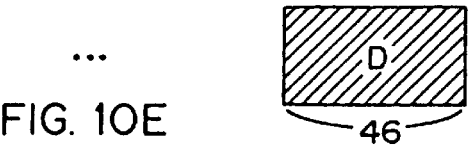
FIG. 10E
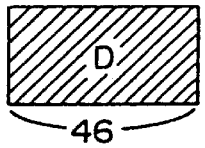
FIG. 10F
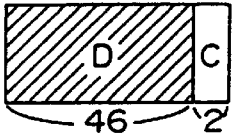
FIG. 10G

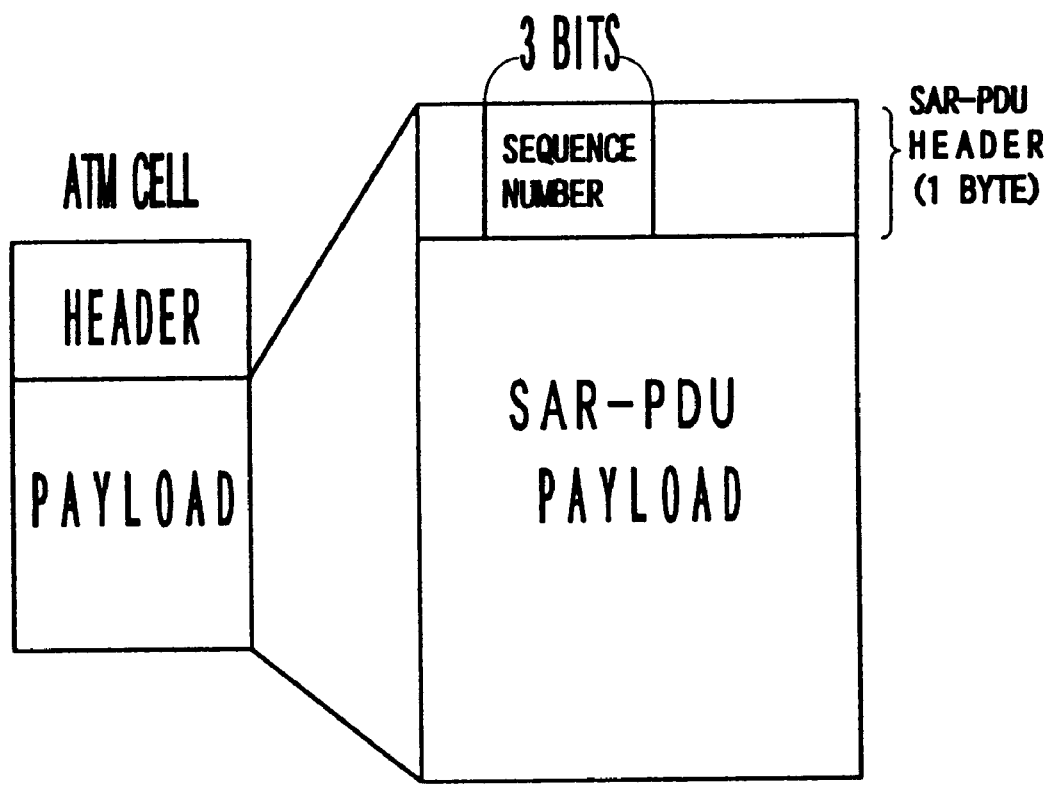
F I G. 1 4 A
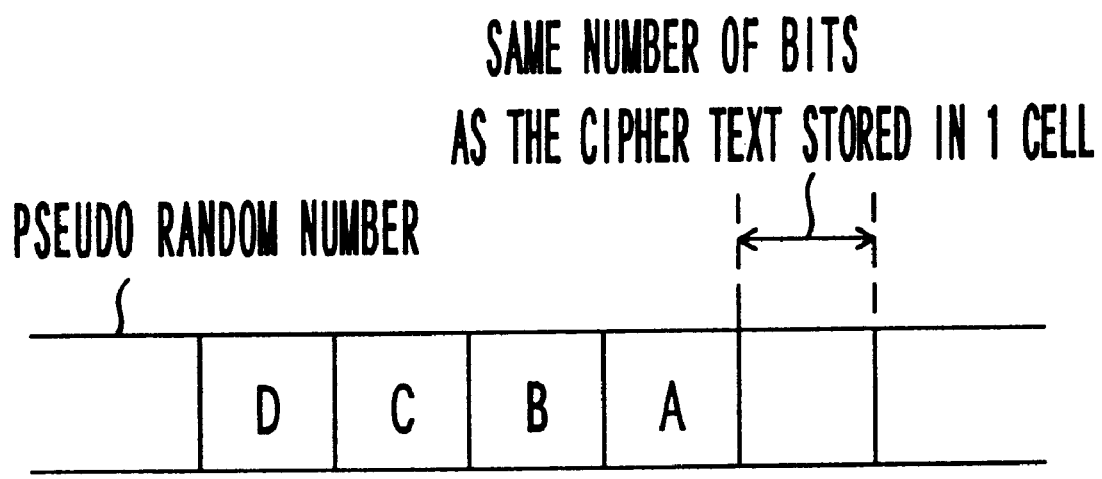
F I G. 1 4 B

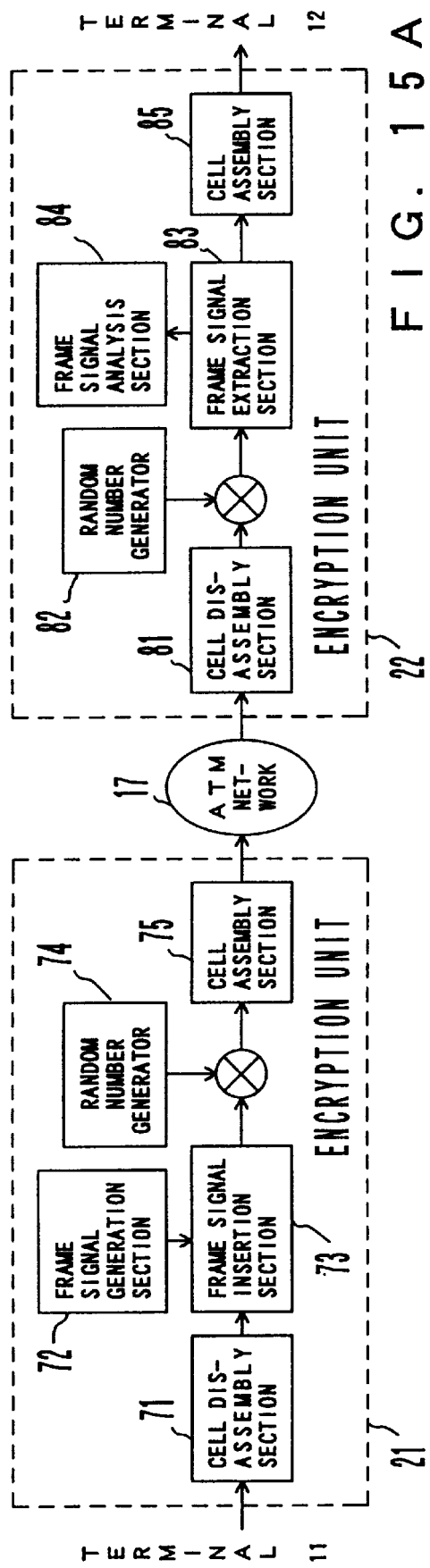
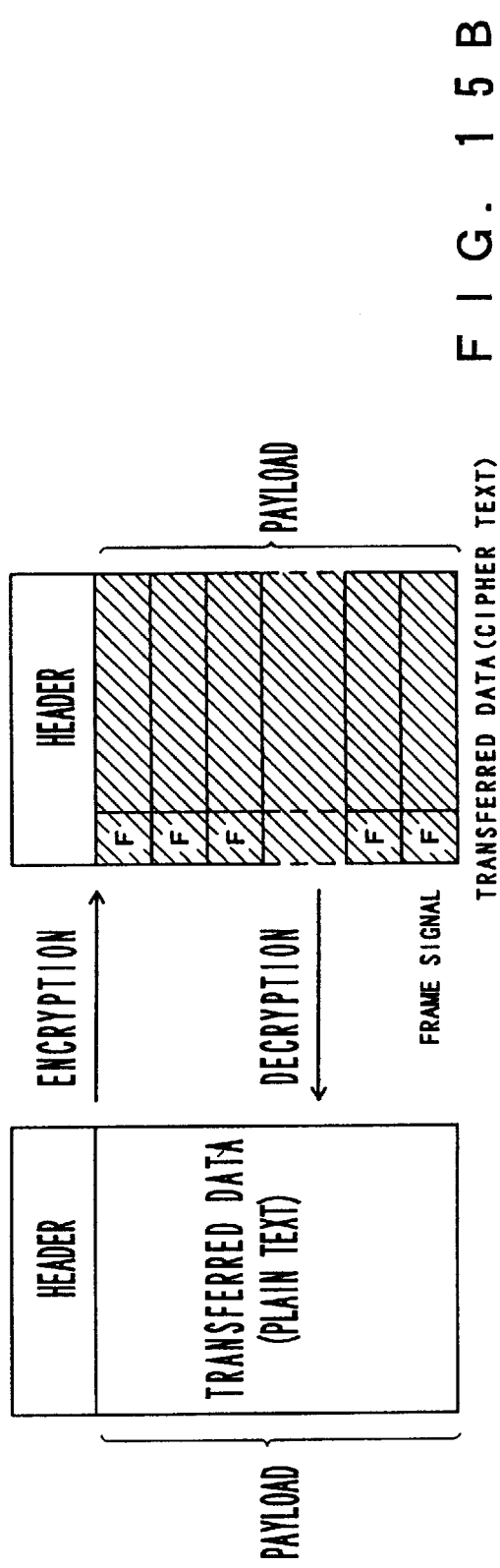
FIG. 15A
FIG. 15B

FIG. 16A
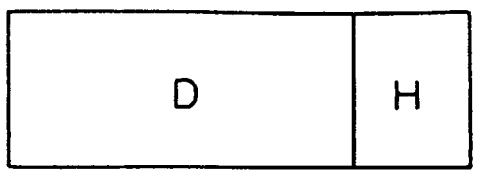
FIG. 16B
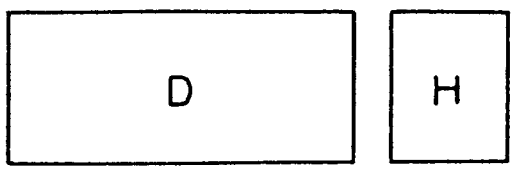
FIG. 16C
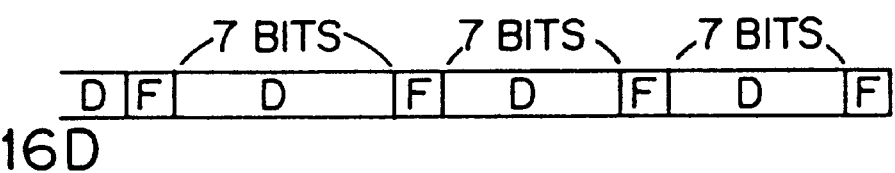
FIG. 16D
FIG. 16E
FIG. 16F
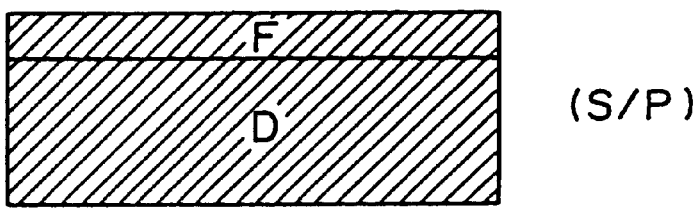
FIG. 16G
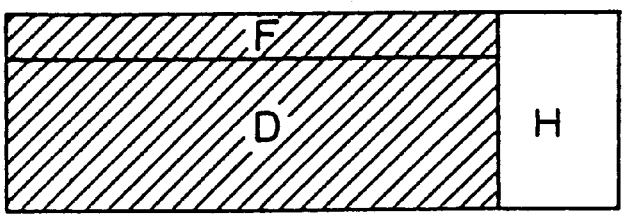

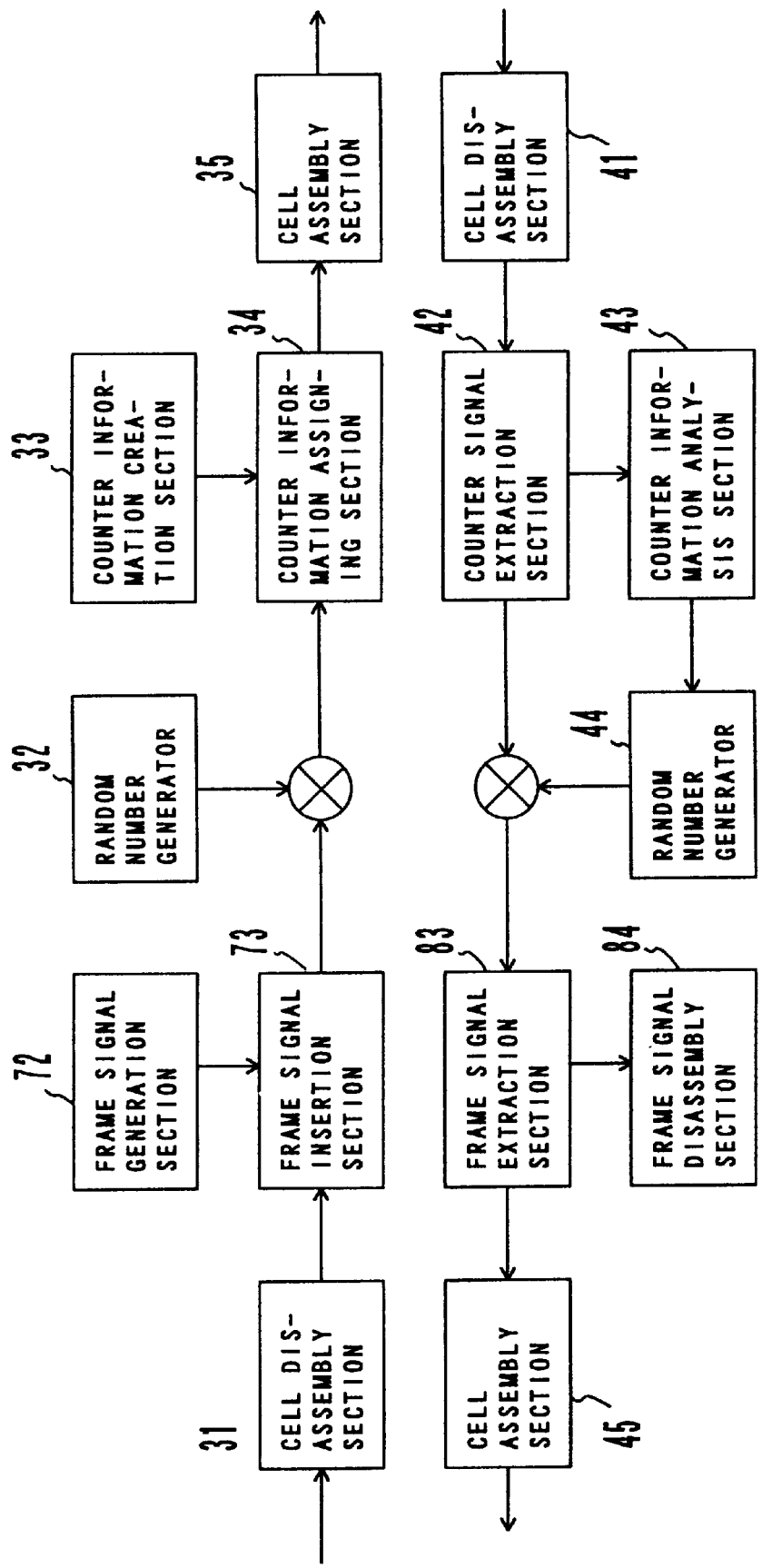
F I G. 17

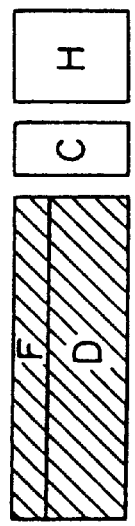
FIG. 18A
FIG. 18B
FIG. 18C
FIG. 18D
FIG. 18E
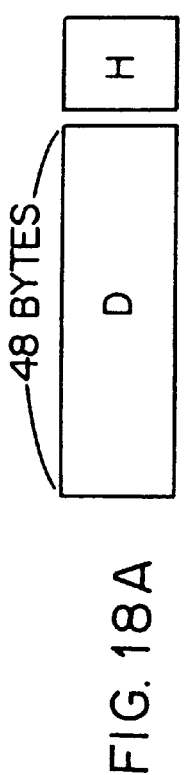
FIG. 18F
FIG. 18G
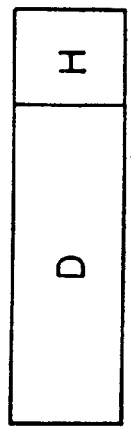
FIG. 18H
FIG. 18I

SECRECY COMMUNICATION SYSTEM

BACKGROUND OF THE INVENTION

1. Field of the Invention

This invention relates to a secrecy communication system. More specifically, it relates to an encrypted communication system that is used in transferring information via an ATM network.

2. Description of the Related Art

Various forms of data, including audio, video and text, are transferred via networks. One widely used method for integrated handling of these various types of data is ATM (Asynchronous Transfer Mode). ATM is a fundamental technology of B-ISDN (broadband ISDN); it has attracted considerable attention as a technology that transfers data both efficiently and at high speed.

In ATM, information is stored in cells to be transferred. A cell is a fixed-length packet of 53 bytes, consisting of a 5-byte header and a 48-byte payload. Information including routing information is set in the header. The information to be transferred is stored in the payload. The ATM network transfers the cells to the specified transfer destination based on the routing information set in the header of each cell.

FIG. 1 is a configuration diagram of one example of a typical ATM network. The terminals 201 and 202 are ATM terminals; they have the functions of sending data to be transferred that are stored in cells and of reproducing data from the cells that are received. The terminals 201 and 202 are directly built into the exchange units. The terminals 203 to 205 are non-ATM terminals; they do not have the functions of sending data to be transferred that are stored in cells and of reproducing data from the cells that are received. Consequently, the terminals 203 to 205 are included in the exchange units through the respective CLADs (Cell Assembly and Disassembly functions) 206 to 208. The exchange units 209 to 212 analyze the routing information set in the cell headers and output each cell to the output line specified by the result of that analysis.

In recent years, various types of information have come to be transferred via networks. Some of this information, such as consumer information in financial services and military information, is secret. For this reason, a function (secrecy function) to protect the transferred information from theft, tampering and destruction. The central technology of the secrecy function is encryption. A variety of encryption methods have been developed; a typical well-known method is DES (Data Encryption Standard).

In the system shown in FIG. 1, when data being transferred between terminals are encrypted, for example, software for the encryption process will be installed in each terminal; the sending terminal sends cells in which encrypted data (cipher text) are stored to the network, while the receiving terminal deciphers the cipher text stored in the received cells and reproduces the data.

FIG. 2 shows the concept of the block cipher, which is one cryptographic method. The most widely used block cipher is DES. In the block cipher, the sending terminal divides the payload in each cell into a number of blocks and then encrypts the payload by executing a transposition cipher, which interchanges the order of blocks, and a substitution cipher, which replaces the original data with other data according to specified rules, repeatedly for a specified number of times. Then the sending terminal sends the cell in which the payload has been encrypted out onto the network.

The network transfers that cell to the transfer destination in accordance with the routing information set in the cell header. The receiving terminal deciphers the payload by executing the transposition cipher and the substitution cipher with respect to the received cell payload in the opposite order to the order in which they were executed in the encryption processing in the sending terminal.

However, in a block cipher of which DES is a typical example, since the transposition cipher and the substitution cipher must be executed as described above, it is difficult to shorten the time required for software processing. For this reason, in a network such as an ATM network in which the data transfer rate is very fast, it is inappropriate to introduce the block cipher.

The stream cipher is known as an encryption method in which high speed processing is possible. In the stream cipher, bits of the plain text are processed one at a time in order; in general, random numbers (pseudo random numbers) are used. In the stream cipher which uses pseudo random numbers, on the sending side the cipher text is obtained by calculating the exclusive logical sum of the plain text to be transferred and the pseudo random numbers one bit at a time. Meanwhile, on the receiving side, pseudo random numbers identical to those that were generated on the sending side are generated, and the original plain text is obtained by calculating the exclusive logical sum of the received cipher text and the pseudo random numbers one bit at a time. Thus, in the stream cipher, complicated software processing is not necessary, so that it is relatively easy to obtain high speed.

However, if an attempt is made to introduce the stream cipher using pseudo random numbers as described above into the ATM network as is, problems such as the following will occur. In the ATM, if the exchanges 209 to 212 become congested, cells will be discarded or the order of arrival of cells at the destination will become interchanged. Consequently, if, for example, when the sending terminal sends the cells in the order cell 1, cell 2, cell 3, . . . , cell 3 is received immediately after cell 1 on the receiving side, the pseudo random number intended for deciphering cell 2 is used for cell 3, so the cipher text cannot be deciphered. Once the cryptographic synchronization (the decryption timing) is thrown off, the cryptographic synchronization cannot subsequently be recovered.

Thus, although the stream cipher using pseudo random numbers is suitable for high speed processing, once the cryptographic synchronization is thrown off it is essentially impossible to recover it, so it is not suitable for a system such as ATM in which it is possible for transferred data to be discarded.

In order to avoid the problem that the cryptographic synchronization is thrown off by the discarding of cells in the exchange units, as shown in FIG. 3 it is conceivable to have a configuration in which only data transmitted on the relay line between exchange units are encrypted. In FIG. 3, the encryption units 213 to 218 have their own respective encryption functions; cells received from the exchange unit are encrypted and sent out onto the relay line, while cells received from the relay line are decrypted and sent to the exchange unit. In a configuration such as this, there is almost no discarding of cells between encryption units, so that cells encrypted in a certain encryption unit (for example the encryption unit 213) in almost all cases arrive at the matching encryption unit (in this case, the encryption unit 216) without being discarded, and the cryptographic synchronization is not thrown off.

However, in this configuration, depending on the route by which the cells are transferred encryption/decryption processing is performed a multiple number of times. For example, in the case in which cells are transferred from the terminal 204 to the terminal 202, encryption/decryption processing is performed between the encryption unit 216 and the encryption unit 213, and between the encryption unit 214 and the encryption unit 217. When the same data are encrypted number of times in this manner, the strength of the encryption decreases. In addition, in this configuration, the data are not encrypted inside the exchange units, so there is a danger that they can be stolen there.

Thus, in existing systems there is danger that data will be discarded in exchange units and in addition that, when secrecy communication is performed in a high speed network, there is the problem that once the cryptographic synchronization is thrown off it cannot be recovered, or alternatively if an attempt is made to prevent that from happening then the level of secrecy will be decreased.

SUMMARY OF THE INVENTION

One purpose of this invention is to provide a method of secrecy communication that will reliably establish and maintain cryptographic synchronization in a high speed network in which there is danger of data being discarded, for example in exchange units. A second purpose of this invention is to prevent theft of information in an ATM network without losing the characteristics of ATM.

The secrecy communication system of this invention is used in a system (such as ATM) which transfers fixed length packets each of which consists of a data section in which data are stored and a header section which includes routing information for the data, and performs an encryption using pseudo random numbers.

On the sending side (the encryption side), an encrypting unit which generates cipher text from data stored in the data section of a fixed length packet and part of a pseudo random number, a generating unit which generates position information indicating the position within the pseudo random number of the part of that pseudo random number that is used by the encrypting unit, and an assembly unit that generates a fixed length packet containing the cipher text and the position information in the data section, are provided.

On the receiving side (the decryption side), an extracting unit that extracts the position information from the data section of a received fixed length packet, a random number generating unit that generates a pseudo random number that is the same as the pseudo random number used by the encrypting unit on the sending side, and a decrypting unit that obtains a part of the pseudo random number generated by the random number generating unit based on the position information extracted by the extracting unit and decrypts the data stored in the data section of the received fixed length packet using the part of the pseudo random number, are provided.

In encrypted communication using pseudo random numbers, in order to decrypt the encrypted data it is necessary to use the same part of the same pseudo random number that was used when encrypting the same data.

In the secrecy communication system of this invention, when data to be transferred are encrypted and stored in a fixed length packet, position information indicating the position of the part of the pseudo random number that was used when encrypting those data to be transferred is stored in the fixed length packet together with the encrypted data, so that on the receiving side it is possible to obtain information used in decrypting the cipher text in each fixed length packet independently for each fixed length packet.

The secrecy communication system of another embodiment of this invention has, on the sending side, an inserting unit that inserts synchronization confirmation data having a predetermined specified pattern into the data section of a fixed length packet, an encrypting unit that encrypts the data section into which those synchronization confirmation data have been inserted, and an assembly unit that generates a fixed length packet containing the data section to be transferred which has been encrypted by the encrypting unit are provided. On the receiving side, a decrypting unit that decrypts the data section of a received fixed length packet, an extracting unit that extracts the synchronization confirmation data from that decrypted data section, and a detecting unit that detects abnormalities in the communication based on whether or not the extracted synchronization confirmation data agree with the predetermined specified pattern, are provided.

In the secrecy communication system having the above configuration, synchronization confirmation data having a predetermined specified pattern are encrypted and transferred together with other transferred data and then decrypted together with the other transferred data on the receiving side, so if it can be detected that the synchronization confirmation data have been correctly reproduced, it is considered that the cryptographic synchronization has been correctly established.

BRIEF DESCRIPTION OF THE DRAWINGS

FIG. 1 shows one example of a general ATM network.

FIG. 4 shows a network using a secrecy communication system which is an embodiment of this invention.

FIG. 5A explains the concept of a cipher system using pseudo random numbers.

FIG. 5B explains cryptographic synchronization.

FIGS. 10A–10G show the sequence of disassembly and reassembly of cells in encryption processing.

FIG. 14A is a configuration diagram of the SAR-PDU.

FIG. 14B explains the decryption processing of transferred data using sequence numbers.

FIG. 15A is a configuration diagram of the second embodiment.

FIG. 15B shows the configuration of a cell used in the second embodiment.

FIGS. 16A to 16G show the sequence of disassembly and reassembly of cells in encryption processing.

FIG. 17 is a configuration diagram of an encryption device that combines the functions of the first and second embodiments.

FIGS. 18A to 18I show the sequence of disassembly and reassembly of cells in the encryption unit shown in FIG. 17.

DETAILED DESCRIPTION OF THE INVENTION

Figure 2:
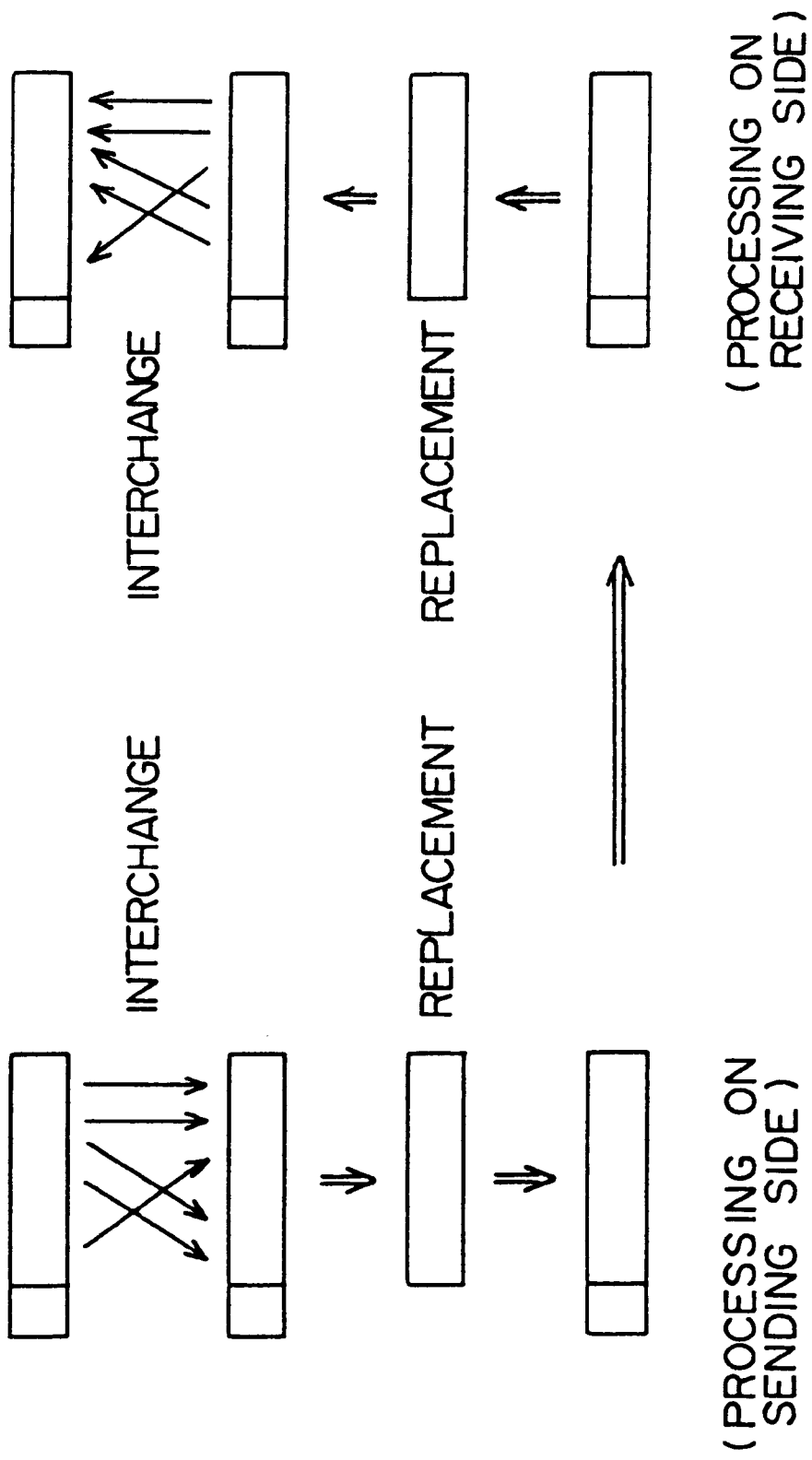
FIG. 2 shows the concept of the block cipher.
Figure 3:
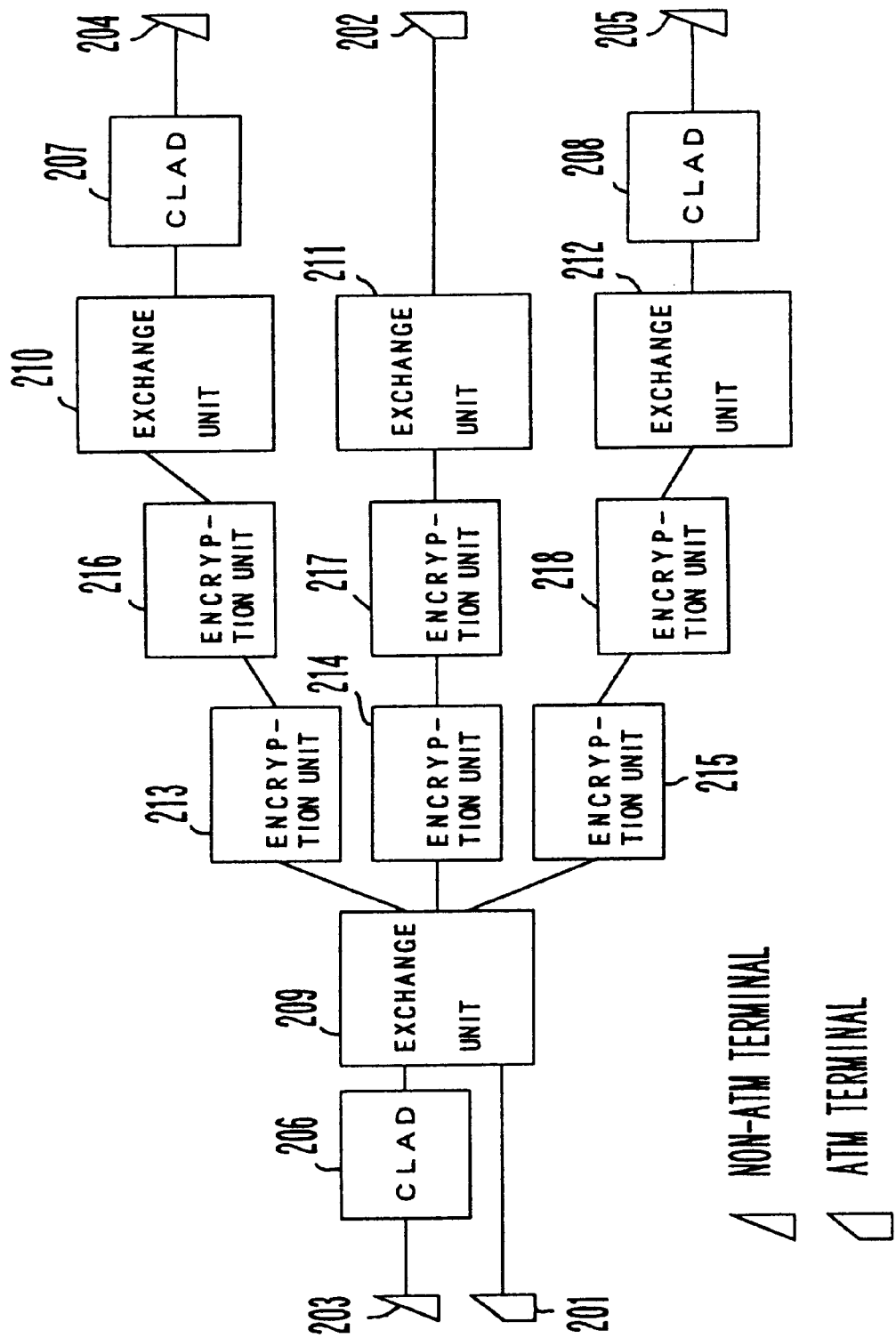
FIG. 3 shows a configuration in which only data transmitted between exchange units on a relay line are encrypted.

Embodiments of this invention will now be explained, referring to the drawings.

FIG. 4 is a configuration diagram of one example of a network that uses the secrecy communication system of this invention. Here, we consider ATM as a communication method that transfers fixed length packets. As the encryption method, we use encryption using pseudo random numbers.

The terminals 11 and 12 are, respectively, ATM terminals; they have the function of storing the data to be transferred in cells and sending them out, and the function of reproducing the data from the received cells. The terminals 13 and 14 are non-ATM terminals; they are connected to the ATM network 17 via the CLADs (cell assembly and disassembly functions) 15 and 16, respectively. The ATM network 17 has a configuration in which ATM exchange unit(s) are connected to one another, and the cells are transferred to their destinations in accordance with the routing information set in the header of each cell.

The encryption units 21 to 24 encrypt, as necessary, the cells sent from the terminals to which they are respectively connected and then send them out onto the ATM network 17. When cells are received from the ATM network 17, those cells are decrypted and transferred to the connected terminals. The encryption units 21 to 24 have, respectively, the random number generators 25 and the random number adders 26. The random number generators 25 generate pseudo random numbers in accordance with a specified rule (or key or seed). The random number adders 26 calculate the exclusive logical sums of the data stored in the cells received from the connected terminals or the ATM network 17 and the pseudo random numbers generated by the random number generators 25, one bit at a time, and output them in sequence.

FIG. 5A is a diagram that explains the concept of a cipher method using pseudo random numbers. In this cipher method, identical random number generators are installed on the sending side and the receiving side, and set so that they will act according to the same rule. That is to say, the same pseudo random numbers are generated on the sending side and the receiving side. On the sending side, exclusive logical sums of the plain text (data that have not been encrypted) and the pseudo random numbers are calculated one bit at a time, and the results are output as cipher text (data that have been encrypted). Meanwhile, on the receiving side, the plain text is recovered by calculating exclusive logical sums of the cipher text and the pseudo random numbers one bit at a time.

In FIG. 5A, the plain text is multiplied by the pseudo random number on the sending side and then the cipher text is multiplied by the reciprocals of same pseudo random numbers that were used on the sending side on the receiving side, but this processing is the same as calculating exclusive logical sums of the plain text and the cipher text with the pseudo random numbers on the sending side and the receiving side, respectively.

FIG. 5B is a diagram that explains cryptographic synchronization (secrecy communication synchronization). In this embodiment, pseudo random numbers of very long period are used; when a cell is encrypted or decrypted, parts of the respective pseudo random numbers are used. Here, in order to accurately decipher the cipher text, it is necessary to use the same pseudo random numbers on the receiving side that are used on the sending side. That is to say, it is necessary to use the same part of a pseudo random number on the receiving side that is used on the sending side. For example, if the part of the pseudo random number starting with the n'th bit is used when cell 1 is encrypted, then the part of that same random number starting with the n'th bit must be used when cell 1 is decrypted. Thus, in this embodiment, data in the same positions within the same pseudo random numbers are used on the sending side and the receiving side; it is said that "a condition of cryptographic synchronization (or secrecy communication synchronization) has been established". In this embodiment, as will be explained below, before encrypted communication is started information relating to the starting positions of the pseudo random numbers to be used in encryption and decryption is exchanged between the encryption unit on the sending side and the encryption unit on the receiving side so that data in the same positions of the same random numbers will be used on the sending side and the receiving side for encryption and decryption.

Returning to FIG. 4, when data to be transferred from terminal 11 to terminal 12 are encrypted, first terminal 11 stores the data to be transferred in cells. When the encryption unit 21 receives a cell from the terminal 11, it extracts the data to be transferred from a payload of that cell and calculates the exclusive logical sums of those data with the exclusive random number. Then the results of those calculations are stored in the cell again and sent out to the ATM network 17. That is to say, the cell sent from the encryption unit 21 to the ATM network 17 has been encrypted.

The ATM network 17 transfers that cell to the terminal 12 in accordance with the routing information set in the header of that cell. The cell transferred to the terminal 12 is received by the encryption unit 22. The encryption unit 22 extracts the transferred encrypted data from the received cell and calculates the exclusive logical sums of those extracted data with the pseudo random number. The data obtained from the results of these calculations are plain text and are in fact precisely the transferred data. Then the encryption unit 22 stores the decrypted transferred data in the cell again and transfers them to the terminal 12; and the terminal 12 extracts the transferred data from that cell.

When normal data transfer (meaning data transfer without encryption) is performed, the encryption units 21 to 24 can change the path through which the cells pass within the system so that the random number adders 26 are bypassed, or, alternatively, the encryption units 21 to 24 can use all-zero pattern data or all-one pattern data in place of the pseudo random number.

Figure 6:
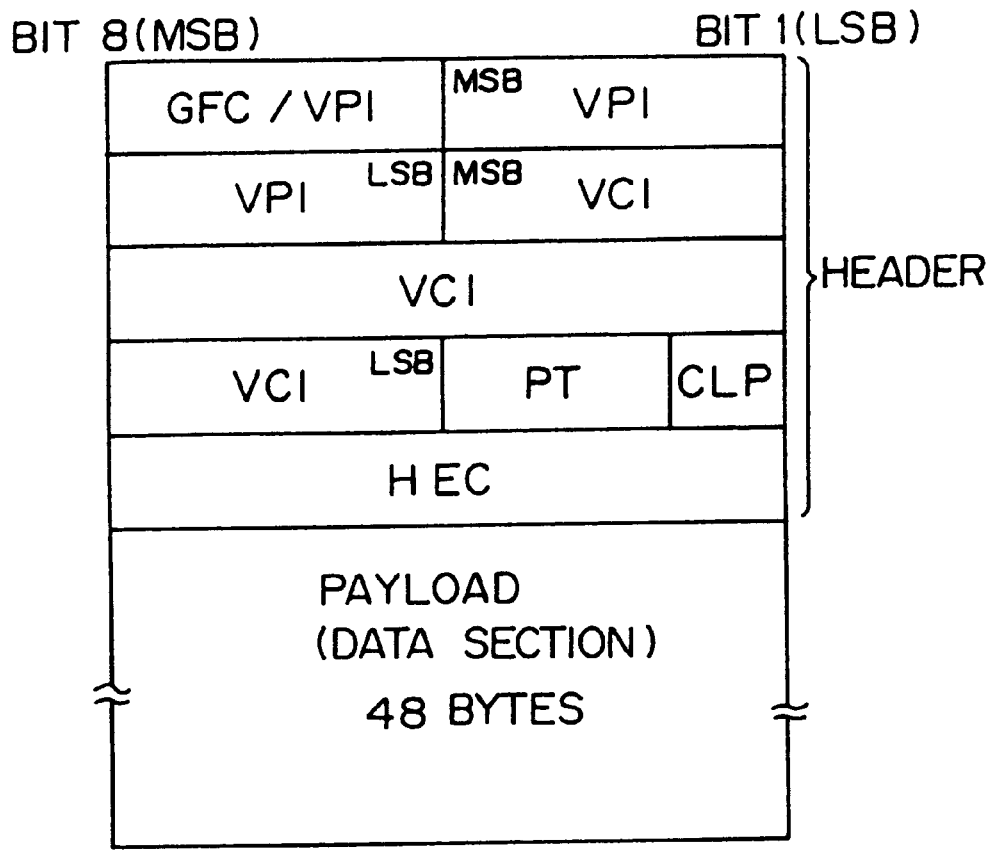
FIG. 6 is a configuration diagram of an ATM cell.

FIG. 6 is a configuration diagram of an ATM cell. This cell consists of a 5-byte header and a 48-byte payload. The GFC (General Flow Control), VPI/VCI (Virtual Path Identifier/Virtual Channel Identifier), PT (Payload Type), CLP (Cell Loss Priority) and HEC (Header Error Control) are set in the header. The VPI/VCI is cell routing information. The format prescribed in the UNI (User-Network Interface) is different from the format prescribed in the NNI (Network-Network Interface); in the NNI, the GFC is not set, and that area is used instead to set the VPI.

The UNIs are interfaces between the terminals 11 to 14 and the ATM network 17; the NNIs are interfaces between the exchange units within the ATM network 17.

Figure 7:
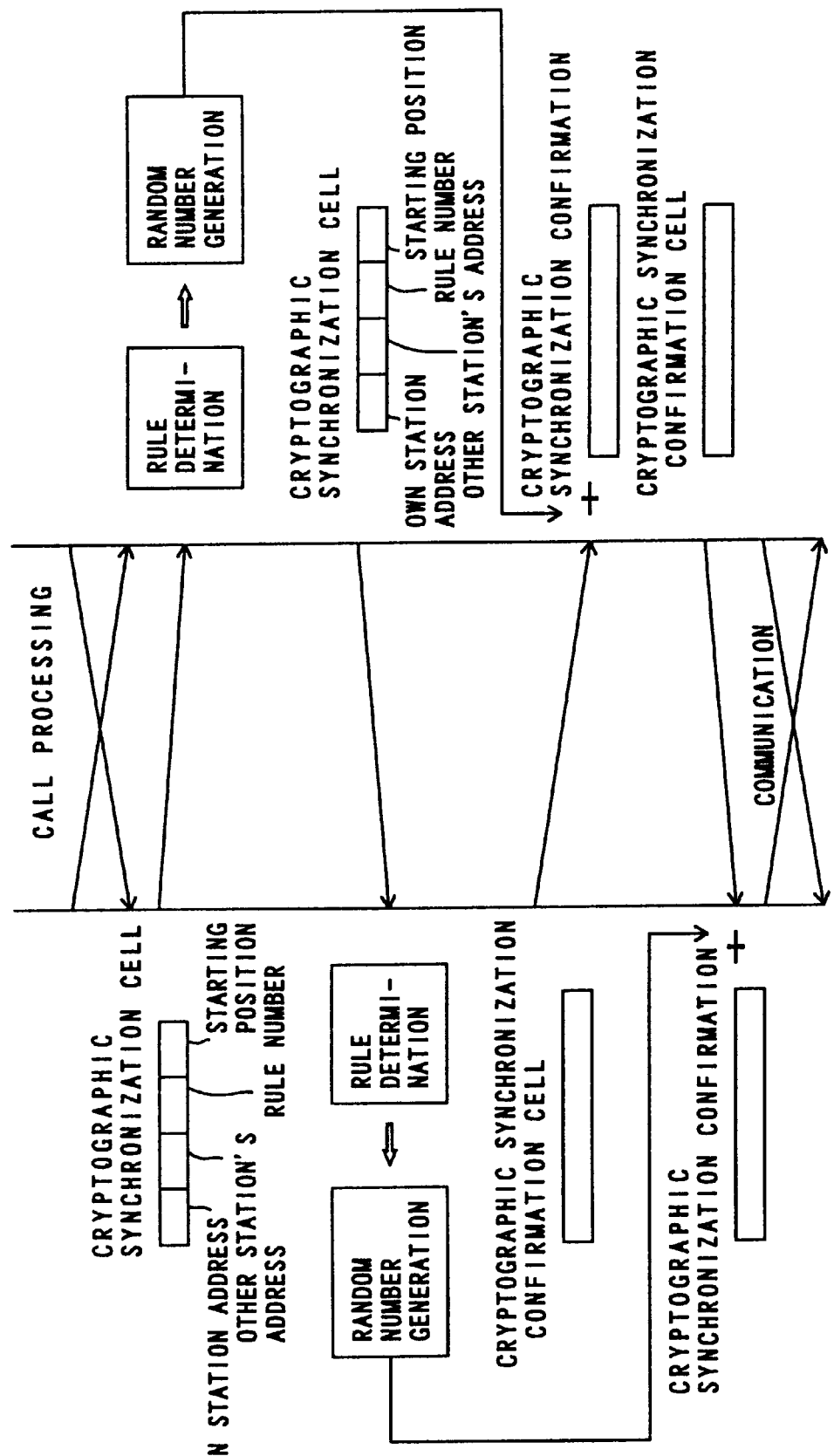
FIG. 7 explains preprocessing for secrecy communication.

FIG. 7 is a diagram that explains preprocessing for the secrecy communication in this embodiment. Here the case in which secrecy communication is performed between the terminal 11 and the terminal 12 is considered, and the action of the encryption units 21 and 22 will be explained.

First, a connection is established by signalling (call processing) between the terminal 11 and the terminal 12. The encryption unit 21 sends a cryptographic synchronization cell to the encryption unit 22 via this connection. The address of the sending station (the address of the encryption unit 21), the address of the receiving station (the address of the encryption unit 22), the rule number and the starting position information are stored in the payload of the cryptographic synchronization cell. The rule number corresponds to the key (or, the seed) for the purpose of generating a pseudo random number. The starting position information indicates from which position within the pseudo random number, generated based on the rule number, the random number data are used for encryption. The cryptographic synchronization cell is, for example, encrypted by an existing method such as DES and transferred.

Figure 8:
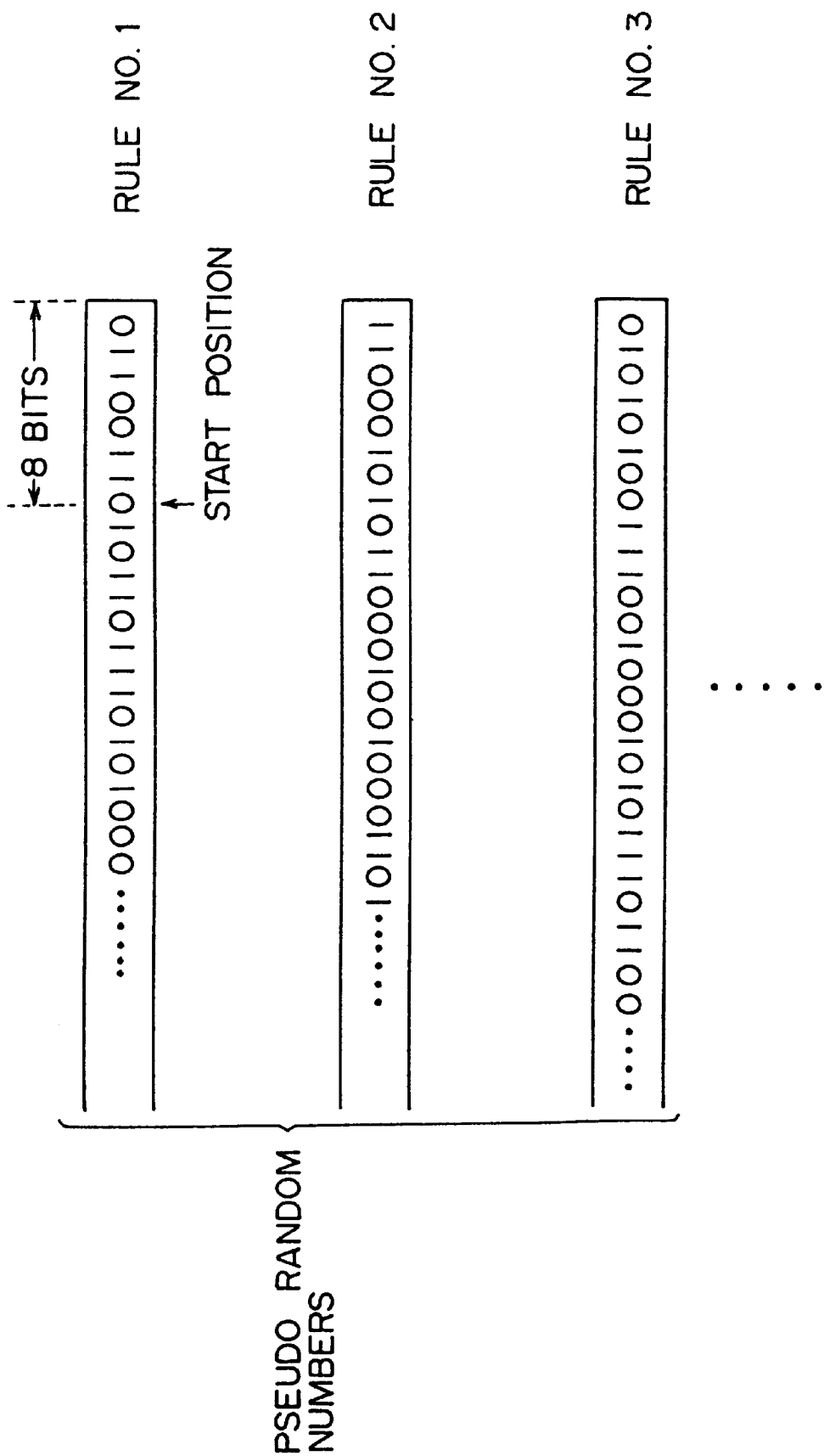
FIG. 8 explains the rule number and the start position of a pseudo random number.

As shown in FIG. 8, each encryption unit has the function of generating the same pseudo random numbers as the others in accordance with the rule numbers 1, 2, 3 . . . Consequently, when a cell is encrypted in, for example, the encryption unit 21 using a pseudo random number generated in accordance with rule number 1, the encryption unit 21 posts "rule number 1" to the encryption unit 22 using the cryptographic synchronization cell to indicate the pseudo random number generated in accordance with rule number 1 is to be used when cells from the encryption unit 21 are decrypted in the encryption unit 22. Specifying the starting position within the pseudo random number in addition to the pseudo random number to be used in the secrecy communication makes it more difficult to decipher the codes. For example, as shown in FIG. 8, when cells are encrypted in the encryption unit 21 using data starting from the 8th bit in the pseudo random number, the encryption unit 21 posts "starting position=8" to the encryption unit 22 using a cryptographic synchronization cell, indicating that the 8th and subsequent bits of the pseudo random number generated in the encryption unit 22 are to be used for decryption. Thus, the encryption units on the sending side and the receiving side of the secrecy communication are in agreement as to both the pseudo random numbers that are using and the starting position within the pseudo random number.

The above setting operation is preprocessing for the encryption of cells to be transferred from the terminal 11 to the terminal 12. Similar preprocessing is done for the encryption of cells to be transferred from the terminal 12 to the terminal 11. The pseudo random numbers and the starting positions within those pseudo random numbers to be used on the sending side and the receiving side of the secrecy communication are brought into agreement by transferring cryptographic synchronization cell from the encryption unit 22 to the encryption unit 21.

The encryption terminals 21 and 22 check the accuracy of the secrecy communication by sending a cryptographic synchronization confirmation cell between the encryption units before the transfer of actual data between the terminals. Here, we assume that the data stored in the payload of the cryptographic synchronization confirmation cell have been decided upon in advance. First, the encryption unit 21 uses the pseudo random number (in the above example, rule number 1, starting position=8) to encrypt the payloads of the cryptographic synchronization confirmation cell and then sends the cell to the network. Then the encryption unit 22 decrypts the received cryptographic synchronization confirmation cell using the pseudo random number generated in accordance with the rule number and the starting position which have been posted by the cryptographic synchronization cell; if the predetermined data are obtained by this decryption processing, then it is considered that the secrecy communication is being performed accurately. Similarly, the cryptographic synchronization confirmation cell is transferred from the encryption unit 22 to the encryption unit 21 to confirm the accuracy. If an abnormality is detected in the confirmation process, the encryption units 21 and 22 encrypt/decrypt the data transferred between terminals 11 and 12.

The above explanation described the processing that takes place when a connection between terminals is established, but basically the same processing is performed when, for example, a connection has already been established and secrecy communication is started upon instruction from a user.

Figure 9A:
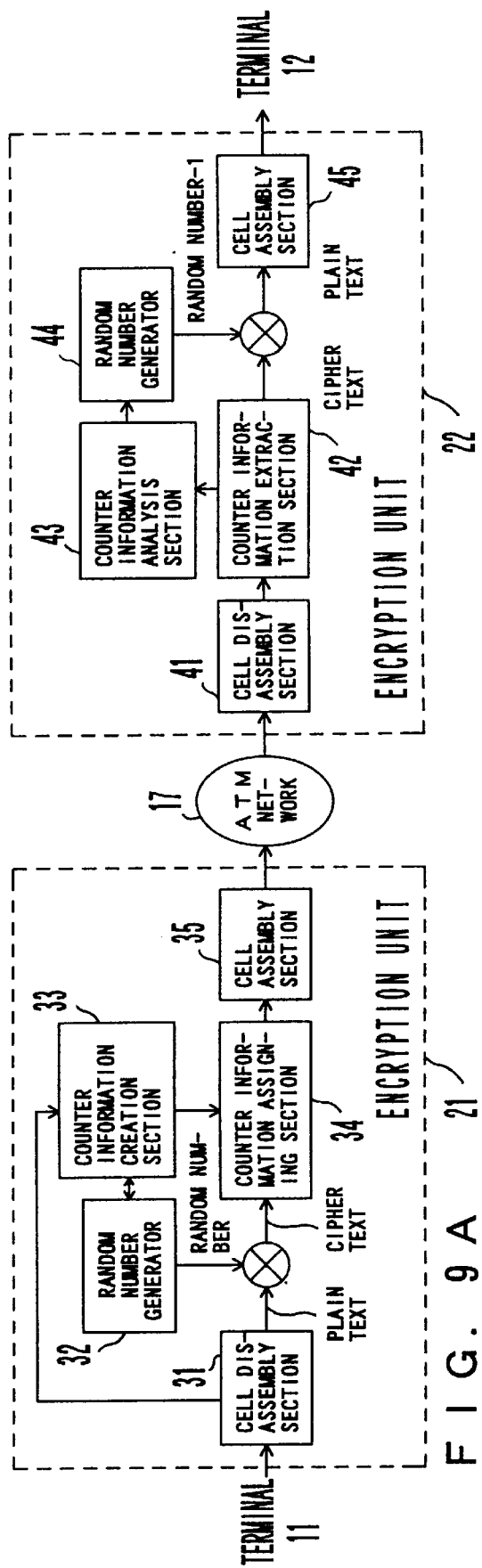
FIG. 9A is a configuration diagram of the first embodiment of this invention.

FIG. 9A is a block diagram of an encryption unit in the first embodiment of this invention. Here we explain the configuration and action of encryption unit using the example of the encryption units 21 and 22 among the encryption units 21 to 24 shown in FIG. 4. Note that in FIG. 9A, only the encryption function is provided in the encryption unit 21 and only the decryption function is provided in the encryption unit 22, but each of the encryption units 21 to 24 has both an encryption function and a decryption function. Hereafter it is assumed that cells are encrypted and then transferred from the terminal 11 to the terminal 12 in the order cell 1, cell 2, cell 3.

Figure 9B:
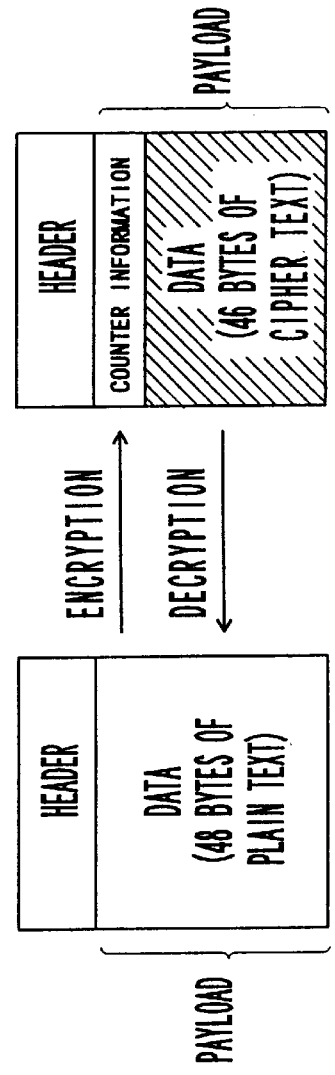
FIG. 9B shows the configuration of a cell used in the first embodiment.

In the first embodiment, when encryption is performed, as shown in FIG. 9B, counter information is inserted into the payload of each cell. The counter information consists of, for example, 2 bytes, and indicates the order (1, 2, 3 . . . ) in which the cells are sent out. That is to say, the counter information 1, 2, 3, . . . is set in cell 1, cell 2, cell 3 respectively. For this reason, 46 bytes of cipher text are stored in the payload of each cell. The cells in which this cipher text and the counter information are stored are sent out onto the ATM network 17. Now let us explain the structure and the action of the encryption unit 21 which performs encryption processing, referring to FIGS. 10A to 10G.

When a cell is received from the terminal 11, the cell disassembly section 31 disassembles it into the header and the payload (FIGS. 10A and 10B).

Figure 11:
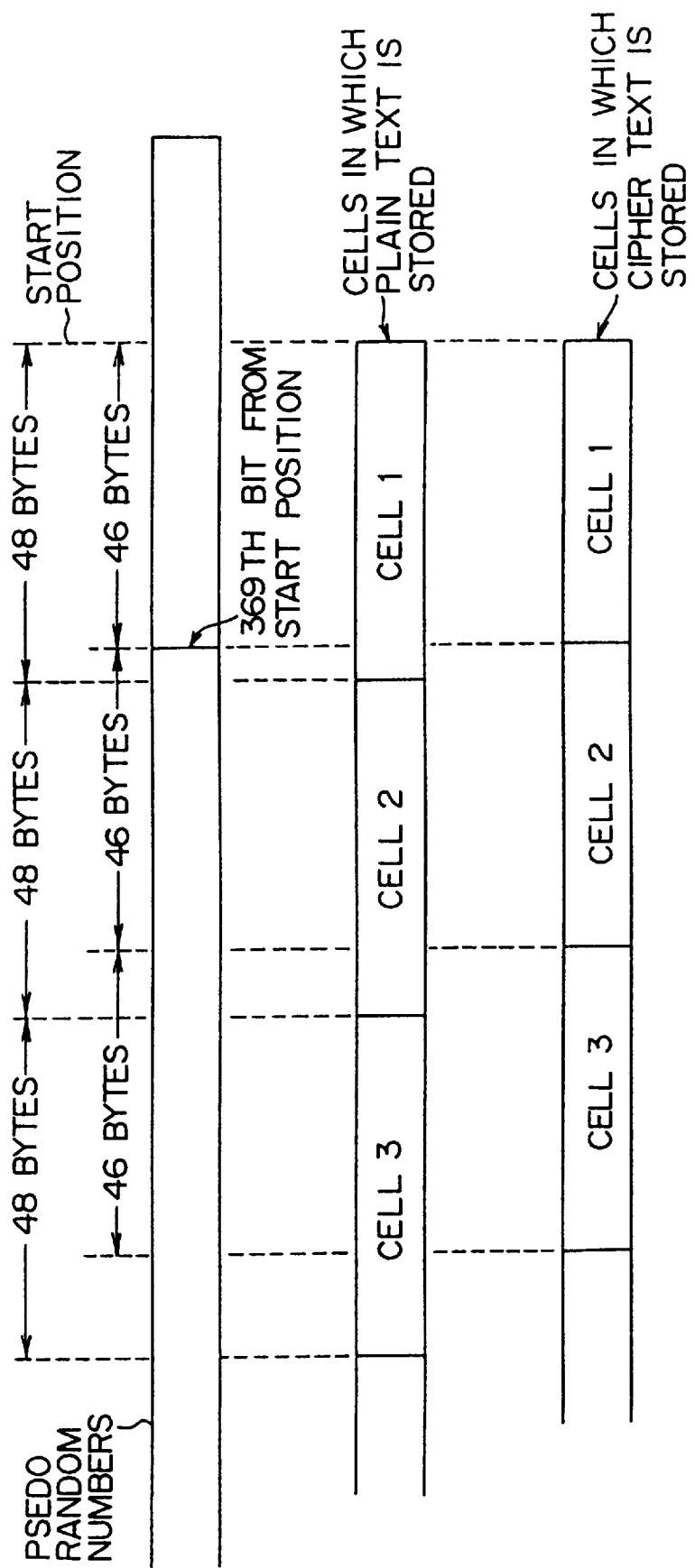
FIG. 11 explains the processing in which pseudo random numbers are assigned to cells.

The random number generator 32 generates a pseudo random number in accordance with the rule that was decided on in advance before the encrypted communication started, then outputs the digits of the pseudo random number starting from the start position that was decided on in advance, partitioned into groups of 48 bytes at a time. Each such group of 48 bytes of the pseudo random number is assigned to the payload of a received cell, in order of receipt. Specifically, as shown in FIG. 11, the 1st to 48th bytes from the start position of the generated pseudo random number are assigned to the payload of cell 1, the 49th to 96th bytes are assigned to the payload of cell 2 and subsequently each group of 48 bytes of the pseudo random number are assigned similarly to the payload of a received cell. Then the exclusive logical sum (or product) of the payload of each cell and the 48 pseudo random number bytes is calculated to create 48 bytes of cipher text (FIG. 10C).

The counter information creation section 33 contains a counter that increments by 1 every time a cell is received from the terminal 11. The count value on that counter is output to the counter information assigning section 34 as counter information.

As groups of 48 bytes of cipher text, obtained by calculating the exclusive logical sums of payloads of each cell and pseudo random number, are received one group after another, the counter information assigning section 34 converts that cipher text into groups of 46 bytes of cipher text (FIGS. 10D and 10E).

Then, the counter information assigning section 34 assigns the counter information received from the counter information creation section 33 to those groups of 46 bytes of cipher text each. The data consisting of 2 bytes of counter information added to each 46 bytes of cipher text become the payloads of the cells that are sent from the encryption unit 21 to the ATM network 17 (FIG. 10F).

The cell assembly section 35 assembles cells by supplying the headers extracted by the cell disassembly section 31, as they are, to the payloads created by the counter information assigning section 34, and sends those cells out onto the ATM network 17 (FIG. 10G).

As shown in FIG. 10G, the cells sent to the ATM network 17 each consists of a header that has not been encrypted and a payload which in turn stores the counter information which has not been encrypted and the encrypted information to be transferred.

By means of the processing described above, groups of 46 bytes of encrypted transferred data are stored respectively in the cells sent from the encryption unit 21 to the ATM network 17. Here, as shown in FIG. 5A, the encryption method of this embodiment uses 1 bit of a pseudo random number to encrypt 1 bit of the transferred data, so in order to encrypt each cell that is sent to the ATM network 17, 46 bytes of the pseudo random number are used for each group of transferred data. That is to say, in the encryption unit 21, as shown in FIG. 11, the 1st to 46th bytes, 47th to 92nd bytes, and 93rd to 138th bytes of the generated pseudo random number from the start position are used for cells 1, 2 and 3, respectively, and subsequently 46 bytes of the pseudo random number are used in order for each cell.

In the processing described above, the numbers 1, 2, 3 . . . are assigned respectively to the cells 1, 2, 3 . . . sent from the encryption unit 21 to the ATM network 17 as counter information. Here, the cells are fixed length packets. Accordingly, when the cells are received, looking at the counter information assigned to those cells, it is possible to identify which part of the pseudo random number was used to encrypt the transferred data on the sending side (the encryption unit 21). That is to say, on the receiving side (the encryption unit 22), the counter information assigned to each cell can be used as information that indicates position or area within the pseudo random number used for the encryption.

The configuration and action of the encryption unit 22 that receives cells from the ATM network 17 and decrypts them will now be explained. The cell disassembly and reassembly sequence in the decryption processing basically follows the order of FIGS. 10G to 10A.

The cell disassembly section 41 disassembles each cell received from the ATM network 17 into a header and a payload. The counter information extraction section 42 extracts the counter information from the payload of the received cell and transfers it to the counter information analysis section 43. This counter information was assigned by the encryption unit 21 and indicates the order in which the cells were sent from the terminal 11 to the terminal 12.

The counter information analysis section 43 multiplies the counter information stored in the received cell by 368 (46 bytes–368 bits), then subtracts 367 from the product (hereafter this value will be called the "decryption start position") and posts this difference to the random number generator 44. For example, when cell 1 is received, 1 has been assigned to it as the counter information, so 1×368 −367=1 is obtained as the decryption start position. Similarly, when cell 2 is received, 2 has been assigned to it as the counter information, so 2 ×368−367=369 is obtained as the decryption start position.

The decryption start position indicates the starting position of the part of the pseudo random number used when the transferred data stored in each cell were encrypted on the sending side (in the encryption unit 21). For example, in the case of the transferred data that are stored in cell 2, as shown in FIG. 11, viewed from the pseudo random number starting position the 47th to 92nd bytes of data were used in the encryption; viewed from the said starting position, the leading bit of the 47th byte is the 369th bit viewed from the starting position. Thus, based on the counter information assigned to the received cell, the encryption unit 22 is able to obtain the leading position of the part of the pseudo random number that was used when the transferred data stored in that received cell were encrypted on the sending side.

When the random number generator 44 receives the encryption start position from the counter information analysis section 43, it extracts and outputs the 46th byte of data counted starting from the bit specified as the encryption start position from the pseudo random number which the random number generator 44 generated internally. Then the 46th bytes of plain text is obtained by calculating the exclusive logical sum of that 46th byte of the pseudo random number and the encrypted transferred data stored in the payload of the received cell.

When the cell assembly section 45 receives the groups of 46 bytes of plain text obtained by calculating exclusive logical sums of received cell payloads and the pseudo random number one after another, it converts that plain text into groups of 48 bytes of plain text, then assigns the headers extracted by the cell disassembly section 41 to those groups of 48 bytes of plain text and assembles cells. Then the encryption unit 22 sends those assembled cells to the terminal 12.

Thus, in this first embodiment, when cipher text is stored in cells and sent out, counter information indicating the order in which they were sent out is assigned to each cell; when that cipher text is decrypted on the receiving side, the position of the part of the pseudo random number that was used in the encryption processing on the sending side is identified based on that counter information, and the cipher text is decrypted using that identified part of the pseudo random number. That is to say, this counter information is essentially information that indicates the position of the part of the pseudo random number that was used in the encryption processing. The reason why it is possible to establish a 1:1 correspondence between the counter information that indicates the order in which cells are sent and the information that indicates the position of the part of the pseudo random number that was used in the encryption processing is that the cells are fixed length packets. That is to say, this embodiment is obtained by using one of the features of ATM.

Further, in this first embodiment, information that indicates the position of the part of the pseudo random number used in encryption processing is assigned to each cell and posted from the sending side to the receiving side, so the cipher text stored in each cell can be decrypted independently of other cells. That is to say, even if, for example, a cell should be discarded on the ATM network, the cipher text stored in cells that follow that discarded cell can still be decrypted.

Figure 12:
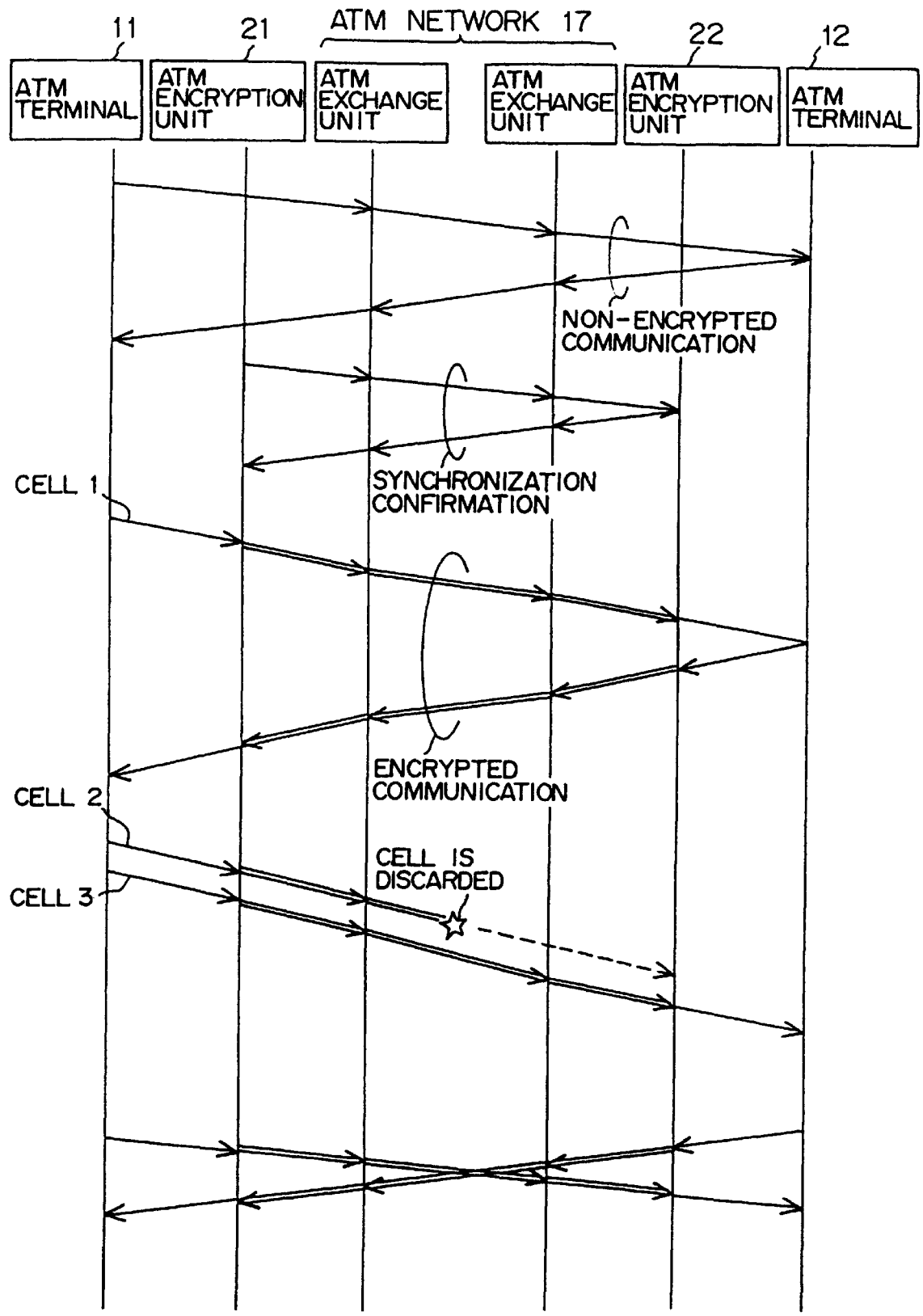
FIG. 12 shows the flow of data in the first embodiment.

FIG. 12 is a diagram that shows the flow of data in the first embodiment. When data are transferred between terminals, if encryption is not applied, then the cells are not processed by the encryption units. That is to say, the encryption units are bypassed.

When encrypted communication is to be carried out, then, as explained in FIG. 7, the information needed for cryptographic synchronization is sent and received between encryption units to establish a path for encrypted communication. The encryption unit on the receiving side decrypts the cipher text stored in each cell independently from other cells, in accordance with the counter information assigned to each cell. For this reason, even if a cell (such as cell 2) that stores cipher text is discarded during the encrypted communication, the encryption unit on the receiving side can correctly decrypt the cipher text stored in the next cell (cell 3) without being affected by the discarding of that cell.

Figure 13:
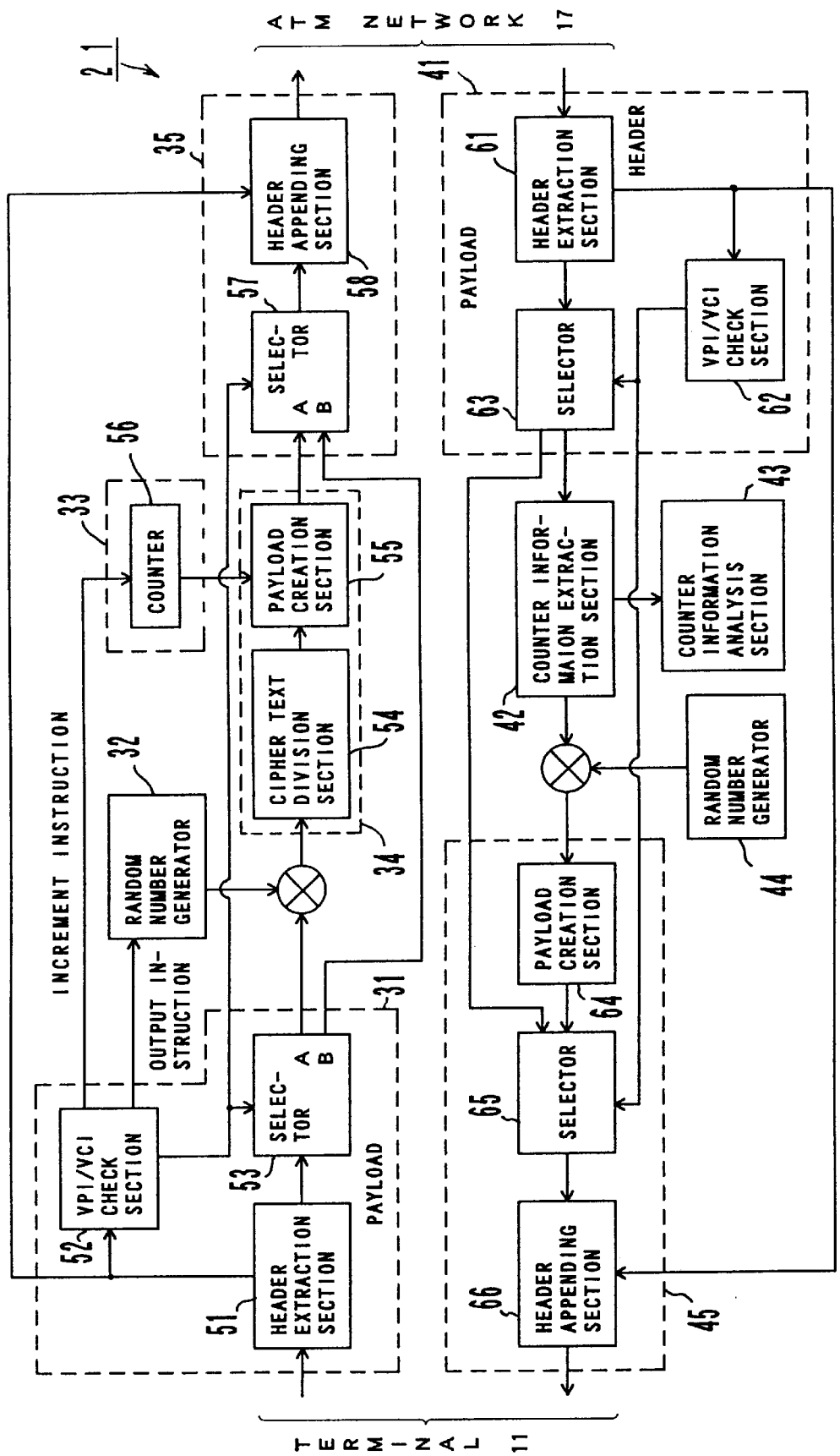
FIG. 13 is a configuration diagram of the encryption unit of the first embodiment.

FIG. 13 is a specific configuration diagram of the encryption unit of the first embodiment. Here, for the sake of argument we consider the encryption unit 21 as representative of the encryption units 21 to 24. In FIG. 13, the blocks have the same functions as the blocks identified by the same symbols in FIG. 9.

The cell disassembly section 31 has a header extraction section 51, a VPI/VCI check section 52 and a selector 53. The header extraction section 51 extracts the header from the received cell and transfers that header to the cell assembly section 35 and the VPI/VCI check section 52, and, at the same time, transfers the payload of the received cell to the selector 53.

The VPI/VCI that is used in the encrypted communication is set in the VPI/VCI check section 52 before the encrypted communication starts. If, for example, in a case in which encryption is to be applied to the data transferred from the terminal 11 to the terminal 12, the VPI/VCI that specifies the route from the terminal 11 to the terminal 12 that was determined when the connection was established (or has been determined permanently) is set. Then the VPI/VCI check section 52 checks whether or not the VPI/VCI stored in the header of the received cell agrees with the VPI/VCI that was set before the start of the encrypted communication; if they agree, it is judged to be necessary to encrypt the received cell.

If the received cell is to be encrypted, the VPI/VCI check section 52 sends an A select signal to the selector 53 and the cell assembly section 35, an output instruction signal to the random number generator 32, and an increment instruction signal to the counter information creation section 33. On the other hand, if the received cell is not to be encrypted, the VPI/VCI check section 52 sends a B select signal to the selector 53 and the cell assembly section 35, and nothing is sent to the random number generator 32 or the counter information creation section 33.

The selector 53 determines the output destination of the payload received from the header extraction section 51 in accordance with the A or B select signal. That is to say, if the received cell is to be encrypted, the selector 53 sends that payload to an exclusive logical sum adder (or multiplier), while if the received cell is not to be encrypted, that payload is transferred as is to the cell assembly section 35.

When an output instruction signal is received from the VPI/VCI check section 52, the random number generator 32 generates a pseudo random number according to the method explained in FIGS. 7 to 11, cuts a specified 48 bytes out from the pseudo random number and outputs the pseudo random number. The cipher text is then created by calculating the exclusive logical sum of the pseudo random number and the payload output from the selector 53. This cipher text is input to the counter information assigning section 34. The cipher text division section 54 partitions the received cipher text into groups of 46 bytes each and sends them to the payload creation section 55.

The counter information creation section 33 has a counter 56. When an increment instruction signal is received from the VPI/VCI check section 52, the counter 56 is incremented and the new value is posted to the payload creation section 55 as counter information.

The payload creation section 55 writes the counter information into the first 2 bytes of the payload, then stores the 46 bytes of cipher text received from the cipher text division section 54 in the remaining area.

The output from the payload creation section 55 is connected to terminal A of the selector 57. The output from terminal B of the selector 53 is input to terminal B of the selector 57. That is to say, a payload which includes the encrypted data is input to terminal A of the selector 57, while a payload consisting only of transferred data that has not been encrypted is input to terminal B of the selector 57. The selector 57 selects either the data input to terminal A or the data input to terminal B, in accordance with the A or B select signal received from the VPI/VCI check section 52 and outputs those data. The header appending section 58 appends a header to the payload output from the selector 57, creates a cell and sends that cell out onto the ATM network 17.

Thus, the encryption unit 21 judges whether or not to apply encryption to data to be transferred stored in a cell received from the terminal 11 in accordance with the VPI/VCI set in that cell; when encryption is to be applied, the data to be transferred are multiplied by the pseudo random number, and counter information is inserted.

The cell disassembly section 41 has a header extraction section 61, a VPI/VCI check section 62 and a selector 63. The functions of the header extraction section 61, the VPI/VCI check section 62 and the selector 63 are basically the same as those of the header extraction section 51, the VPI/VCI check section 52 and the selector 53 of the cell disassembly section 31. However, the header extraction section 61 extracts the headers of cells received from the ATM network 17. In addition, when encryption is to be applied in data transfer from a terminal (here this is terminal 12) to the terminal 11, the VPI/VCI check section 62 is set when the VPI/VCI that specifies that transfer route establishes a connection between the terminals (or it may be permanently preset). The counter information extraction section 42, the counter information analysis section 43 and the random number generator 44 are as was explained with reference to FIG. 9A.

The cell assembly section 45 has a payload creation section 64, a selector 65 and a header appending section 66. The payload creation section 64 outputs the decrypted data in groups of 48 bytes at a time as payloads to be stored in cells sent to the terminal 11. The selector 65 and the header appending section 66 have basically the same functions as the selector 57 and the header appending section 58.

Thus, the encryption unit 21 judges whether or not the transferred data stored in a cell received from the ATM network 17 have been encrypted in accordance with the VPI/VCI set in that cell; when encryption has been applied, a position of a part of the pseudo random number to be used in a decryption processing is detected based on the counter information set in that cell, and cipher text is decrypted using the detected part of the pseudo random number.

In the embodiment described above, values indicating the order in which cells were sent out from the terminal were used as the counter information, but other values could also be used. For example, in an AAL (ATM Adaptation Layer) Type 1, data are sent and received in units called SAR-PDUs (cell disassembly and reassembly Protocol Data Units), as shown in FIG. 14A; sequence numbers are assigned to the headers of these SAR-PDUs. These sequence numbers are cyclical values from 0 to 7 that indicate the order in which the cells were sent; cell loss can be detected on the receiving side by monitoring these values. For example, if a cell having the sequence number 2 is received after a cell having the sequence number 1, it is considered that there was no cell loss; while if a cell with the sequence number 5 is received immediately after the cell with the sequence number 2, it is considered that 2 cells were lost (here the possibility that the order of cells could have become interchanged is neglected).

An example in which this sequence number is used as counter information in the embodiment is shown in FIG. 14B. Here, we assume that the cipher text that is stored in the cell having the sequence number 2 is decrypted using part A of the pseudo random number. If the cell having the sequence number 3 is received immediately after that cell, it is considered that there has not been any loss of cells, and part B of the pseudo random number is used when decrypting the cipher text stored in that cell of sequence number 3. However, if the cell having sequence number 5 is received immediately after the cell having sequence number 2, it is considered that 2 cells have been lost, and when the cipher text stored in that cell of sequence number 5 is decrypted, part B and part C of the pseudo random number are discarded and part D is used.

A different value could also be used as the counter information. For example, information that directly expresses the position within the pseudo random number of the part of the pseudo random number used when encrypting the transferred data on the sending side (for example, the number of bits from the start) can be stored in each cell and transferred.

FIG. 15A is a block diagram of an encryption unit of the second embodiment of this invention. Here, the encryption units 21 and 22 within the encryption units 21 to 24 shown in FIG. 4 will be explained, using the case in which data are transferred from terminal 11 to terminal 12. In FIG. 15A, only the encryption function in the encryption unit 21 and only the decryption function in the encryption unit 22 are considered, but in fact each of the encryption units 21 to 24 has both an encryption function and a decryption function.

In the second embodiment, when encryption is performed, as shown in FIG. 15B, a frame signal is inserted into the payload of each cell. The frame signal is, for example, inserted as the leading bit of each byte making up the payload. In this case, there are 48 bits of the frame signal. The frame signal is information in a predetermined pattern, and is encrypted on the sending side together with the data to be transferred. On the receiving side, when the transferred data and the frame signal is decrypted, if the predetermined pattern of the frame signal is obtained, then it is considered that the entire payload has been correctly transferred and decrypted. Now the configuration and action of the encryption unit 21 that performs the encryption processing with reference to FIGS. 16A to 16G will be explained.

The cell disassembly section 71 separates each cell received from the terminal 11 into a header and a payload. Then the payload is converted into serial data and output (FIGS. 16A to 16C).

The frame signal generation section 72 generates and outputs 48-bit frame numbers. The frame signal is in a predetermined pattern; for example, it could consist of 0s and 1s that alternate.

The cell signal insertion section 73 partitions the transferred data received from the cell disassembly section 71 into groups of 7 bits and then inserts a 1-bit frame number for each 7 bits of transferred data in sequence (FIG. 16D).

The random number generator 74, as in the case of the first embodiment, generates a pseudo random number in accordance with a rule number that was predetermined before the start of the secrecy communication, partitions it into groups of 48 bytes for each cell and outputs it. Then the exclusive logical sum of the pseudo random number and the output of the frame signal insertion section 73 is calculated one bit at a time. Here, the output of the frame signal insertion section 73 consists of data that are inserted as a frame signal into the transferred data, so in the processing described above the transferred data and the frame signal are encrypted together (FIG. 16E).

The cell assembly section 75 creates the payloads of cells to be sent out to the ATM network 17 by converting the encrypted data into 8-bit parallel format. Then the header extracted in the cell disassembly section 71 is assigned to the payload to assemble the cell, and the cell is sent out to the ATM network 17 (FIGS. 16F and G).

The action of the encryption unit that receives and decrypts the cell is basically the reverse of the sequence described above, proceeding from FIG. 16G to FIG. 16A.

The cell disassembly section 81 separates each cell received from the ATM network 17 into a header and a payload, converts the payload into serial data and outputs it. This payload is cipher text.

The random number generator 82 generates the same pseudo random number as the random number generator 74 on the sending side. Further, as was explained in FIG. 7, the start position of the random number used in the encryption and decryption processing are synchronized on the sending side and the receiving side. Then that cipher text is decrypted by calculating the exclusive logical sums of the cipher text output from the cell disassembly section 81 with the pseudo random number output from the random number generator 82. The plain text obtained by this decryption processing consists of transferred data and the frame signal.

The frame signal extraction section 83 extracts the frame signal from the data decrypted in the processing described above. Since the frame signals have been inserted into the transferred data at a fixed interval (every 7 bits), it is easy to extract the frame signal from the transferred data. Then the frame signal extraction section 83 transfers the extracted frame signal to the frame signal analysis section 84, and the remaining transferred data are transferred to the cell assembly section 85.

The frame signal analysis section 84 analyzes the frame signal when 48 bits of the frame signal received from the frame signal extraction section 83 have accumulated. At this time, whether or not the prespecified pattern (in the above example, a pattern of alternating 0s and 1s) has been obtained as the frame signal is checked. If the specified pattern is obtained, the frame signal analysis section 84 judges that the payload of the cell has been transmitted without breakdown and in addition that cryptographic synchronization has been established between the encryption unit on the sending side and the encryption unit on the receiving side. On the other hand, if the specified pattern is not obtained, the frame signal analysis section 84 judges that there has been a breakdown of the payload of the cell or that cryptographic synchronization has not been established. That is to say, when the frame signal inserted into the payload cannot be reproduced, it is considered that the data in the payload (that is to say, the data transferred between the terminals 11 and 12) also cannot be reproduced. In this way, the encryption unit can detect whether or not the data stored in the payload of that cell can be correctly reproduced before the cell arrives at the destination terminal.

The frame signal analysis section 84 executes similar analysis for each cell. If the specified pattern cannot be detected for a succession of cells, that fact is posted to, for example, terminal 11, terminal 12 or the sending side encryption unit (encryption unit 21). When this information is posted, the terminal 11 stops sending data. In addition, the terminal 12 executes error processing.

Thus, in the system of the second embodiment, inability to reproduce the transferred data can be detected by the encryption unit. In addition, by investigating whether or not the frame signal inserted into the payload of each cell has been correctly transmitted, it is possible to detect whether the payload contents have been destroyed. In the encryption communication, the specified processing is performed on the data stored in the payload (in this case, the exclusive logical sum with a pseudo random number is calculated), compared with non-encrypted communication, it is estimated that there is a higher probability that part of the payload or the payload itself will be destroyed. For this reason, it is very important to detect whether or not transferred data are being correctly reproduced in the encryption unit.

The encryption unit of the second embodiment, like the encryption unit of the first embodiment shown in FIG. 13, has a function which detects whether or not a received cell is related to encrypted communication by means of the VPI/VCI stored in that cell, and, if that cell is not related to encrypted communication, skips encryption/decryption processing using a pseudo random number.

FIG. 17 is a configuration diagram of an encryption unit that has the functions of both the said first and second embodiments. The item numbers used in FIG. 17 correspond respectively to the same item numbers used in FIG. 9A and FIG. 15.

When encryption has been applied to a cell received from the terminal, the encryption unit shown in FIG. 17 first inserts a frame signal into the payload of that cell, as shown in FIGS. 18A to 18B. Then it encrypts the data to be transferred and the frame signal stored in that payload, as shown in FIG. 18C and FIG. 18D. Then it appends counter information to these encrypted data, appends a header and sends the data to the ATM network.

Meanwhile, when an encrypted cell is received from the ATM network, the encryption unit shown in FIG. 17 separates the header and the counter information from that cell, and decrypts the cipher text stored in that cell based on that counter information, as shown in FIGS. 18F to 18G. In addition, the frame signal is extracted from those decrypted data, as shown in FIG. 18H and whether or not the payload has been destroyed, and whether or not cryptographic synchronization has been established, are checked according to whether or not that frame signal agrees with the predetermined pattern. Then, if that check fails to find anything abnormal, the decrypted data not including the frame signal are considered to constitute the cell payload, and then a header is appended to that payload and it is sent to the destination terminal.

In general, a plurality of connections (logical channels) are established on an ATM network line (for example, an ATM relay line), and cells having different routing information (VPI/VCIs) travel on each connection. Whether the communication is to be encrypted or not is set for each channel. Consequently, if the configuration is such that an encryption unit that can provide a plurality of secrecy communications is installed on the line and secrecy communication is provided on that plurality of connections using that encryption unit, the cost of the whole system can be decreased. An encryption unit that provides a plurality of encrypted communications will now be explained.

Figure 19:
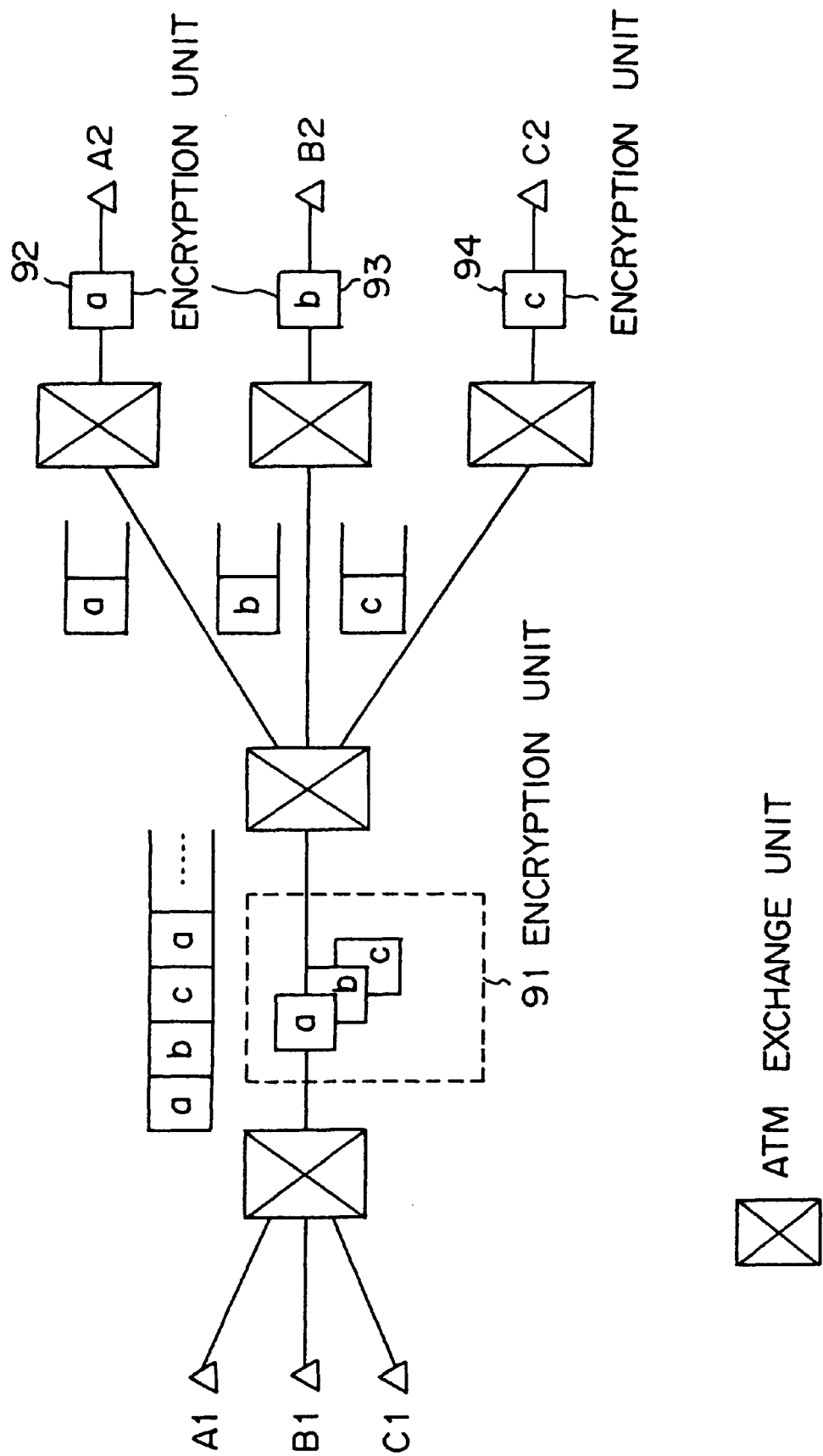
FIG. 19 is a configuration diagram of a system including an encryption device that provides a plurality of secrecy communications.

FIG. 19 is a configuration diagram of a system in which an encryption unit that provides a plurality of secrecy communications is installed. The encryption unit 91 has a plurality of random number generators, and can provide a plurality of encrypted communications simultaneously. When encryption is applied to communication between the terminals A1 and A2, the random numbers to be used in the encrypted communication are determined by the sending and receiving of cryptographic synchronization cells shown in FIG. 7 between the encryption unit 91 and the encryption unit 92. Here, the random number a is used. Similarly, the random numbers to be used in communication between the terminals B1 and B2 and between the terminals C1 and C2, in case those communications are to be encrypted, are determined by the sending and receiving of cryptographic synchronization cells between the encryption unit 91 and the encryption units 93 and 94, respectively. Here, the random numbers b and c, respectively, will be used.

The encryption unit 91 determines the pseudo random numbers to be used according to the routing information set in the headers of the received cells, and executes encryption and decryption using those pseudo random numbers.

Figure 20:
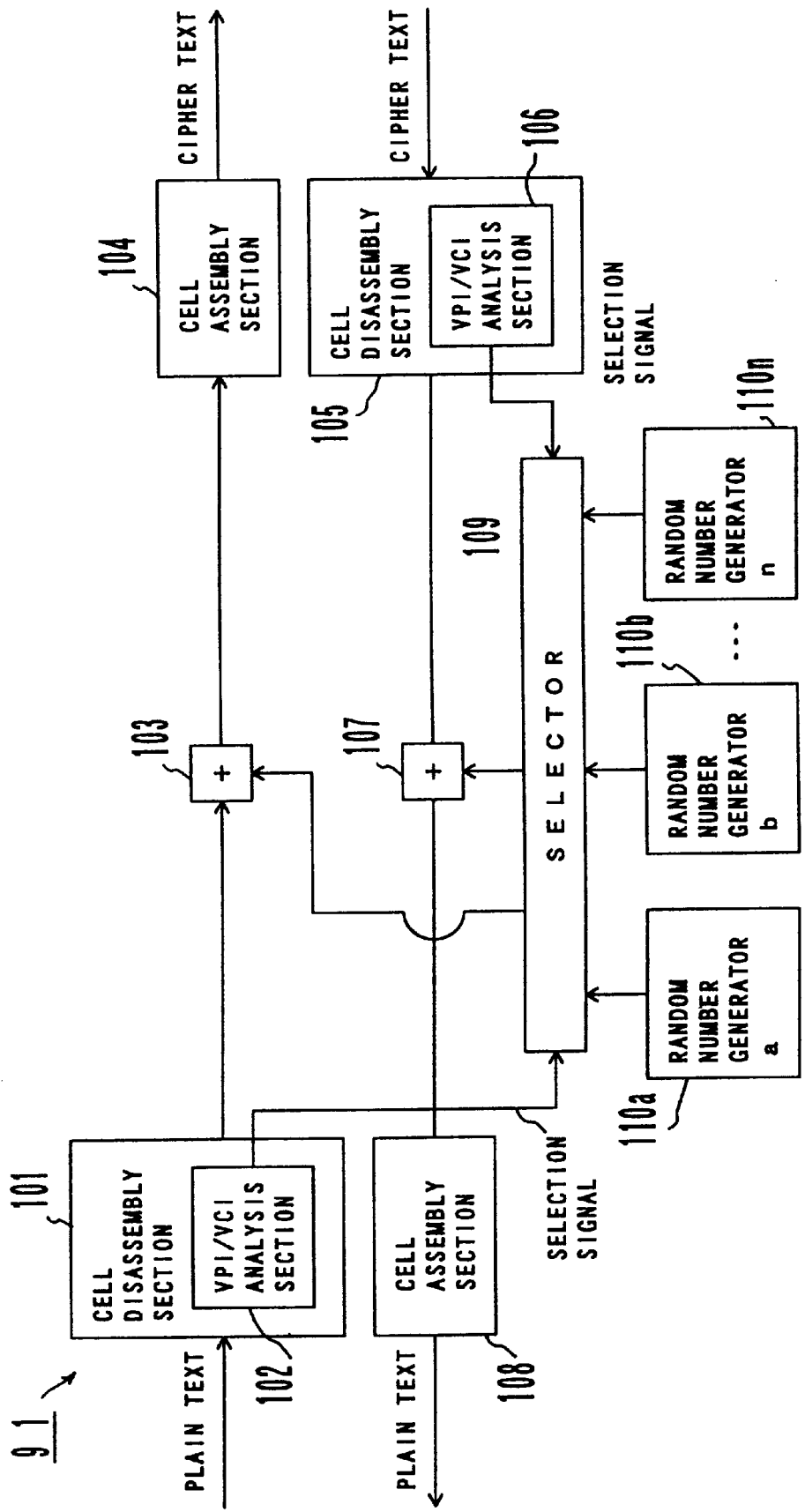
FIG. 20 is a configuration diagram of an encryption unit that provides a plurality of secrecy communications.

FIG. 20 is a configuration diagram of an encryption unit that provides a plurality of secrecy communications. The cell disassembly sections 101 and 105 have the VPI/VCI analysis sections 102 and 106, respectively. The VPI/VCI analysis sections 102 and 106 have their respective relationships between the VPI/VCIs that perform encrypted communication and the pseudo random numbers corresponding to those VPI/VCIs. That is to say, as shown in FIG. 19, for example, assuming that VPI/VCI-A is set in cells transferred from the terminal A1 to the terminal A2, and that it is determined that the pseudo random number a is to be used for sending encrypted cells from the encryption unit 91 to the encryption unit 92, the fact that VPI/VCI-A is related to the pseudo random number a is set in the VPI/VCI analysis section 102.

Cells sent from the terminal A1, B1 or C1 are received by the cell disassembly section 101. The cell disassembly section 101 converts the payloads of those cells into serial data and then outputs them. In addition, the VPI/VCI analysis section 102 analyzes the VPI/VCI set in the header of that cell; detects whether or not the data stored in that cell are to be encrypted and, if they are to be encrypted, which of the random numbers a to n is to be used; and outputs a selection signal based on the result of that detection. For example, in the example described above, when it is detected that "VPI/VCI-A" is set in the header of the received cell, a selection signal indicating that "random number a" is selected is sent to the selector 109.

The selector 109 receives the pseudo random numbers a to n generated by the random number generators 110a to 110n. and outputs one of those based on the selection signal. For example, in the example described above, when "random number a" is received as the selection signal from the VPI/VCI analysis section 102, the selector 109 selects the pseudo random number generated by the random number generator 110a and sends it to the exclusive logical adder 103.

The exclusive logical adder 103 calculates the exclusive logical sum of the cell payload that has been converted to serial data by the cell disassembly section 101 and the pseudo random number selected by the selector 109, and sends it to the cell assembly section 104. Then the cell assembly section 104 appends a header to the encrypted data and sends them to the destination.

The action (decryption processing) when a transferred cell is received by the terminal A1, B1 or C1 is basically the same as the encryption processing described above. Note that when the selector 109 receives a selection signal from the VPI/VCI analysis section 106, the pseudo random number selected in accordance with that signal is sent to the exclusive logical adder 107.

Thus, the encryption unit 91 provides a plurality of secrecy communications simultaneously by executing encryption/decryption processing while switching the pseudo random numbers that are used in accordance with the routing information in the received cells.

In the embodiments described above, the encryption unit 91 is installed on the ATM network relay line in a configuration that is used for n:n communications; but the encryption unit 91 could also be connected to a terminal and used for 1:n communication (multicast communication) to and from that terminal.

The encryption unit could also be a separate unit, independent from the terminals; or a board that includes, for example, an LSI that provides the encryption/decryption function described above could be produced and secrecy communication performed by incorporating that board into a terminal. In addition, the encryption/decryption function could be described in a software program and a terminal provided with the secrecy communication function by installing the software program in that terminal.

As described above, in the present invention, cryptographic synchronization is established separately for every fixed length packet in which data to be transferred are stored, so that even if a packet is lost during the communication, cryptographic synchronization is automatically established for succeeding packets. For this reason, interruption of the secrecy communication due to packet loss can be avoided.

In addition, there is a function that checks whether or not the encrypted data stored in the payload of each fixed length packet are being correctly transmitted and correctly reproduced, so that it is easy to analyze the causes of abnormalities in the communication.

Furthermore, when this invention is used in an atm, the atm communication protocol does not have to be changed during encryption processing, so that the characteristics of the atm do not have to be sacrificed for the sake of secrecy communication.

What is claimed is:

1. A secrecy communication system which is installed in a system that transfers fixed length packets each consisting of a data section in which data are stored and a header section including routing information for the data, comprising:

encrypting means for creating cipher text from data stored in the data section of a fixed length packet and part of a pseudo random number;

generating means for generating position information that indicates the position within the pseudo random number of the part of that pseudo random number that is used by said encrypting means;

assembling means for creating a fixed length packet in which the cipher text created by said encrypting means and the position information, which is not encrypted, are stored in the data section;

extracting means for extracting the position information from the data section of a received fixed length packet;

random number generating means for generating a pseudo random number that is the same as the pseudo random number used by said encrypting means; and decrypting means for obtaining a part of the pseudo random number generated by said random number generating means based on the position information extracted by said extracting means and decrypting the data stored in the data section of the received fixed length packet using the part of the pseudo random number.

2. The secrecy communication system according to claim 1, wherein, the position information indicates the order in which the fixed length packets are sent.

3. A secrecy communication system which is installed in a system that transfers fixed length packets each consisting of a data section in which data are stored and a header section including routing information for the data, comprising:

encrypting means for creating cipher text from data stored in the data section of a fixed length packet and part of a pseudo random number;

generating means for generating position information that indicates the position within the pseudo random number of the part of that pseudo random number that is used by said encrypting means;

assembling means for creating a fixed length packet in which the cipher text created by said encrypting means and the position information, which is not encrypted, are stored in the data section;

extracting means for extracting the position information from the data section of a received fixed length packet;

random number generating means for generating a pseudo random number that is the same as the pseudo random number used by said encrypting means;

decrypting means for obtaining a part of the pseudo random number generated by said random number generating means based on the position information extracted by said extracting means and decrypting the data stored in the data section of the received fixed length packet using the part of the pseudo random number, said encrypting means, said generating means and said assembly means being installed on a sending side of said secrecy communication system, and said extracting means, said random number generating means and said decrypting means being installed on a receiving side of said secrecy communication system; and wherein, before the encrypted communication starts, a fixed length packet in which information needed to establish a cryptographic synchronization is stored is sent and received between the sending side and the receiving side.

4. A secrecy communication system that is used in a system for transferring fixed length packets each of which consists of a data section in which data are stored and a header section including routing information for the data, comprising:

inserting means for inserting synchronization confirmation data having a predetermined specified pattern into the data section of a fixed length packet;

encrypting means for encrypting the data section of the fixed length pocket in which the synchronization confirmation data have been inserted;

assembly means for creating a fixed length packet that is to transfer the data section encrypted by said encrypting means;

decrypting means for decrypting the data section of a received fixed length packet;

extracting means for extracting the synchronization confirmation data from the decrypted data section; and detecting means for detecting abnormalities in communication based on whether or not the extracted synchronization confirmation data agree with the predetermined specified pattern.

5. The secrecy communication system according to claim 4, wherein, said inserting means, said encrypting means and said assembly means are installed on the sending side of said secrecy communication system; said decrypting means, said extracting means, and said detecting means are installed on the receiving side of said secrecy communication system; and wherein before the encrypted communication starts, a fixed length packet in which the information needed to establish a cryptographic synchronization is stored is sent and received between the sending side and the receiving side.

6. A secrecy communication apparatus installed in a system that transfers fixed length packets each consisting of a data section in which data are stored and a header section including routing information for the data, comprising:

encrypting means for creating cipher text from data stored in the data section of a fixed length packet and part of a pseudo random number;

generating means for generating position information that indicates the position within the pseudo random number of the part of that pseudo random number that is used by said encrypting means;

assembling means for creating a fixed length packet in which the cipher text created by said encrypting means and the position information, which is not encrypted, are stored in the data section; and sending means for sending the fixed length packet created by said assembly means to a unit which generates a pseudo random number that is the same as the pseudo random number used by said encrypting means and decrypts the data stored in the data section of the fixed length packet using a part of the generated pseudo random number obtained based on the position information stored in the fixed length packet.

7. A secrecy communication apparatus that is installed in a system that transfers fixed length packets each consisting of a data section in which data are stored and a header section including routing information for the data, comprising:

extracting means for receiving a fixed length packet from a unit that creates cipher text from data stored in the data section of a fixed length packet and part of a pseudo random number, creates position information indicating the position within that pseudo random number of the part of that pseudo random number used in creating the cipher text, and creates a fixed length packet which stores the cipher text and the position information in the data section; and for extracting the position information from the received fixed length packet;

random number generating means for generating a pseudo random number that is the same as the pseudo random number that was used by the unit; and decrypting means for obtaining a part of the pseudo random number generated by said random number generating means based on the position information extracted by said extracting means and decrypting the data stored in the data section of the received fixed length packet using the part of the pseudo random number.

8. A secrecy communication apparatus used in a system that transfers fixed length packets each consisting of a data section in which data are stored and a header section that includes routing information for the data, comprising:

inserting means for inserting synchronization confirmation data having a predetermined specified pattern into the data section of a fixed length packet;

encrypting means for encrypting the data section of the fixed length packet in which the synchronization confirmation data have been inserted;

assembly means for creating a fixed length packet that are to transfer the data section encrypted by said encrypting means;

sending means for sending the fixed length packet created by said assembly means to a unit that decrypts the data sections of the fixed length packet, extracts the synchronization confirmation data from the decrypted data section, and detects abnormalities in communication based on whether or not the extracted synchronization confirmation data agree with the predetermined specified pattern.

9. A secrecy communication apparatus, used in a system that transfers fixed length packets each consisting of a data section in which data are stored and a header section that includes routing information for the data, and decrypting the encrypted data, comprising:

decrypting means for receiving a fixed length packet from a unit that inserts synchronization confirmation data having a predetermined specified pattern into the data section of a fixed length packet, encrypts the data sections into which the encryption confirmation data has been inserted, and creates a fixed length packet that transfers the encrypted data section; and for decrypting the data section of the received fixed length packet;

extracting means for extracting the synchronization confirmation data from the decrypted data section; and detecting means for detecting abnormalities in communication based on whether or not the extracted synchronization confirmation data agree with the predetermined specified pattern.

10. A secrecy communication apparatus that performs encryption and decryption using pseudo random numbers in a system that transfers fixed length packets each consisting of a data section in which data are stored and a header section that includes routing information for the data, comprising:

a plurality of random number generators that generate pseudo random numbers which are different from one another;

a selector that selects one from among said plurality of random number generators based on the routing information that is set in the header section of a received fixed length packet; and a processing circuit that encrypts or decrypts the received fixed length packets using the pseudo random number generated by the random number generator selected by said selector.

11. A secrecy communication system used in a system that transfers fixed length packets each of which consists of a data section in which data are stored and a header section that includes routing information for the data, wherein in the encrypted communication range, the data section of the fixed length packet includes data to be transferred which is encrypted using a pseudo random number and information, which is not encrypted, specifying the pseudo random number used to encrypt the data to be transferred.

12. A secrecy communication system that is used in an ATM system, that encrypts a part of each cell excluding the header using a pseudo random number one cell at a time and then transfers the cells within the encrypted communication range.

* * * * *